(12) United States Patent
Seki et al.

(10) Patent No.: US 7,697,201 B2
(45) Date of Patent: Apr. 13, 2010

(54) SCREEN, REAR PROJECTOR, PROJECTION SYSTEM, AND IMAGE DISPLAY UNIT

(75) Inventors: Hideya Seki, Okaya (JP); Satoshi Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 323 days.

(21) Appl. No.: 11/802,516

(22) Filed: May 23, 2007

(65) Prior Publication Data

US 2007/0297050 A1 Dec. 27, 2007

(30) Foreign Application Priority Data

May 24, 2006 (JP) .............................. 2006-143769
Jun. 21, 2006 (JP) .............................. 2006-171149

(51) Int. Cl.
G03B 21/60 (2006.01)
(52) U.S. Cl. ..................................... 359/446
(58) Field of Classification Search .............. 359/226.3, 359/228, 446, 450, 452–454, 459; 353/62
See application file for complete search history.

(56) References Cited

U.S. PATENT DOCUMENTS

| | | | | |
|---|---|---|---|---|
| 2,906,169 | A * | 9/1959 | Saffir ......................... 359/451 |
| 3,334,816 | A * | 8/1967 | Mizuno ........................ 239/18 |
| 4,387,959 | A * | 6/1983 | Lange et al. ................. 359/456 |
| 4,401,368 | A | 8/1983 | Drechsel et al. |
| 5,026,152 | A * | 6/1991 | Sharkey ....................... 352/85 |
| 5,231,530 | A * | 7/1993 | Yen ............................. 359/228 |
| 6,092,900 | A * | 7/2000 | Diedrich et al. ............. 353/122 |
| 6,577,429 | B1 * | 6/2003 | Kurtz et al. ................. 359/279 |
| 6,701,681 | B2 * | 3/2004 | Kim ........................ 52/171.3 |
| 6,731,429 | B2 * | 5/2004 | Lunde ........................ 359/443 |
| 2004/0001182 | A1 * | 1/2004 | Dyner ........................ 353/28 |
| 2004/0080820 | A1 * | 4/2004 | Palovuori et al. ........... 359/443 |
| 2007/0125872 | A1 * | 6/2007 | Damon et al. ................. 239/20 |

FOREIGN PATENT DOCUMENTS

| | | | | |
|---|---|---|---|---|
| GB | 2220278 | A * | 1/1990 | .................. 359/446 |
| JP | A-57-124724 | | 8/1982 | |
| JP | 62148937 | A * | 7/1987 | .................. 359/452 |
| JP | A 11-38512 | | 2/1999 | |
| JP | A 2001-100316 | | 4/2001 | |

OTHER PUBLICATIONS

STI Flow.com Product page for Clear Vinyl Tubing. Current page (retreived Jun. 8, 2009) and Archive.org dated Nov. 18, 2006.*

* cited by examiner

Primary Examiner—Christopher E Mahoney
Assistant Examiner—Leon W Rhodes
(74) Attorney, Agent, or Firm—Oliff & Berridge, PLC

(57) ABSTRACT

A screen that displays images as a result of receiving projection light, includes: a plurality of plate components that are optically transparent and are provided apart from each other; a scatterer that is placed in a light scattering space that is formed between the plurality of plate components, and is formed by dispersing a light scattering material in a gas or liquid dispersion medium; a flow path that allows the scatterer to flow through the light scattering space; and a flow device that causes the scatterer to flow through the light scattering space.

21 Claims, 21 Drawing Sheets

SCREEN, REAR PROJECTOR, PROJECTION SYSTEM, AND IMAGE DISPLAY UNIT

CROSS-REFERENCE TO RELATED APPLICATION

This application claims priority on Japanese Patent Application No. 2006-143769, filed May 24, 2006 and Japanese Patent Application No. 2006-171149, filed Jun. 21, 2006, the contents of which are incorporated herein by reference.

BACKGROUND

1. Technical Field

The present invention relates to a screen, a rear projector, a projection system, and an image display unit.

2. Related Art

In recent years, there has been a rapid increase in the popularity of projectors. In addition to front projection projectors that have become widely used principally in business presentation applications, recently, the level of recognition of rear projectors as a type of large screen television (i.e., PTV; projection television) has been increasing. The greatest advantage of the projection format is that, compared with direct view displays such as liquid crystal televisions and PDP and the like, products having the same screen size can be provided at a lower cost. However, costs are also coming down in direct view displays as well and a higher image quality is also being demanded from projector display units.

Projectors display an image on a screen by irradiating light that is emitted from a light source such as an arc lamp onto optical modulators of liquid crystal light bulbs, and then projecting projection light that has been modulated by the optical modulators onto a screen. At this time, not only are images displayed on the screen, but the entire screen appears to glare. This is because of luminance unevenness that is created by the interference of the light rays. This phenomenon is known as speckle noise, or 'scintillation'.

Here, the principle behind the occurrence of scintillation will be described.

As shown in FIGS. 29A and 29B, light irradiated from a light source 70 is transmitted through a liquid crystal light bulb and is projected onto a screen 74. The projection light that has been projected onto the screen 74 is diffracted by scattering materials 72 that are contained in the screen 74, and is diffused as a result of the scattering materials 72 behaving in the manner of a secondary wave source. As shown in FIG. 29B, two spherical waves that are formed by the secondary wave sources either intensify or offset each other in accordance with their relative phase relationship so as to appear as a light and dark fringe pattern (i.e., interference fringes) between the screen 74 and a viewer. If the focal point of a viewer is matched to an image forming surface S of these interference fringes, then the viewer would notice the interference fringes as scintillation that causes the screen to glare.

Depending on the viewer watching images formed on a screen surface, scintillation may cause an unpleasant view just as if a veil, or lace, or cobweb exists between the screen surface and the viewer. Moreover, the viewer views two overlapping images, namely, the images on the screen and the scintillation, and this creates considerable fatigue in an attempt to focus both the images. Accordingly, this scintillation ends up imparting considerable stress to a viewer which makes viewing almost unendurable.

Recently, advances have been made in the development of new light sources to replace known high pressure mercury lamps. In particular, expectations for laser light sources to become the light sources for next-generation projectors have heightened in view of their energy efficiency, color reproducibility, long life, immediate turning on, and the like. However, projection light on a screen from a laser light source has extremely high interference as a result of the uniformity of the phases of light rays from adjacent areas. Because the coherent length of laser light sources reaches as far as several tens of meters, if light from a single source is split and then resynthesized, lights that has passed through an optical path difference that is shorter than the coherent length and then been synthesized causes strong interference, resulting in an even more prominent scintillation (i.e., interference fringes) than that from a high pressure mercury lamp.

Accordingly, the reduction of scintillation has become an essential technology, in particular, for the manufacturing of projectors that use laser light sources.

The following technologies have been disclosed as measures for reducing scintillation.

JP-A-11-038512 describes a screen that has a three layer structure made up of a diffusion layer, a transparent layer (i.e., a lenticular lens), and a diffusion layer, and in which the screen diffusion has been optimized. By making the scattering layers more complex in this manner, the randomness of the interference unevenness increases. As a result, if there is an increase in the number of fine components contained in the unevenness (i.e., interference fringes that have a small spatial frequency), an effect can arise that, when there is some movement in the line of sight, there is integral averaging of the light due to the residual image characteristics of the human eye. In particular, when viewing dynamic images, because there are frequent movements in the line of sight a reduction in scintillation can be anticipated.

JP-A-2001-100316 describes a screen in which light, an electric field, a magnetic field, heat, stress and the like are applied to a light scattering layer, and the shape, relative positional relationships, and index of refraction of the light scattering objects contained in this light scattering layer are changed over time. By changing the scatter distribution and phase of scattered waves from a light diffusion layer over time in this manner, the prevention of the occurrence of scintillation can be anticipated.

However, in JP-A-11-038512, because the scatter state of the final scattering surface is fixed, the spatial phase distribution between a viewer and a screen that is created by interference between light rays emitted from each point on the scattering surface is also fixed, and the interference unevenness is also visible as a fixed image. Accordingly, the interference unevenness does not completely disappear, and almost no effect can be obtained, particularly in projectors that are equipped with high interference laser light sources. Moreover, in a structure that is based on this type of high scattering, because there is a possibility that image blurring will be generated coincidentally, it is not possible to solve the original purpose of obtaining a high image quality.

Furthermore, in JP-A-2001-100316, a huge amount of driving energy is required in order to change the shape, relative positional relationships, index of refraction and the like of light scattering objects. Moreover, when these driving devices are used, the energy transmission efficiency to the scattering layer is poor, and there is a possibility that vibration, noise, unwanted electromagnetic waves, and exhaust heat will be generated and prevent a pleasant viewing experience. Furthermore, in a structure in which the scattering layer moves in the focusing direction, the size of the image changes. As a result, the positions of contour lines of an image also changes in a horizontal direction and becomes a factor in causing image blurring.

SUMMARY

An advantage of some aspects of the invention is to provide a screen, a rear projector, a projection system, and an image display unit that make it possible to reliably prevent scintillation from projection light, and achieve a higher image quality by avoiding the generation of display unevenness and glaring.

A first aspect of the invention provides a screen that displays images as a result of receiving projection light and includes: a plurality of plate components that are optically transparent and are provided apart from each other; a scatterer that is placed in a light scattering space that is formed between the plurality of plate components, and is formed by dispersing a light scattering material in a gas or liquid dispersion medium; a flow path that allows the scatterer to flow through the light scattering space; and a flow device that causes the scatterer to flow through the light scattering space.

According to the first aspect of the invention, because a scatterer that has a light scattering material in a gas or liquid dispersion medium flows along a flow path through a light scattering space that is formed between a plurality of plate components, it is possible to constantly move the position of the light scattering material. Consequently, the scatter state of the projection light is made to undergo various changes over time by the moving light scattering material, so that interference fringes of the visible projection light move, and that the pattern of the interference fringes change to become more complex. As a result, the projection light is integrally averaged by the residual image characteristics of the human eye and the interference fringes (i.e., scintillation) become no longer visible. In the human eye, because an image that is caused by residual image remains held for a particular time, the image has the characteristic of appearing to be displayed uniformly. Consequently, any interference fringes that have been generated between the screen and the viewer are eliminated, and display unevenness as well as glaring becomes unnoticeable so that an image that is created by projection light can be viewed properly. Accordingly, any sense of unpleasantness that is caused by scintillation is eliminated and viewing fatigue is alleviated.

If a light scattering material is fixed, as is in the known cases, then interference fringes are generated due to the scatter overlap depending on the arrangement intervals between the light scattering materials. However, by employing a structure in which the light scattering materials are made to move, the angle of the diffracting grating, namely, the phase positional relationship among light scattering materials changes so as to cause the pitches and positions of the interference fringes to also change. Moreover, there is also no concern that image blurring will occur concurrently in conjunction with the light scattering.

Moreover, because the light scattering material can be moved using low energy while generating low noise levels, it is unnecessary for the screen itself to be moved, so that it is possible to achieve a reduction in costs and an improvement in product performance.

As a result of the above, it is possible to obtain an image having a high degree of brightness, a high resolution, and a high image quality.

Moreover, it is preferable that the scatterer flow along a surface of the plate components.

According to this type of structure, because the scatterer can be made to spread across the entire surface within the light scattering space, an image represented by the projection light can be shown without causing any residue. Furthermore, although there have been known cases in which the size of the image involuntarily changes as a result of the scatterer moving in the focusing direction, in this type of structure, because the scatterer flows in the surface direction of the optically transparent plate components, it is possible to prevent any changes in the size or the like of the image. Accordingly, because it is possible to reduce scintillation without generating any concomitant image blurring, it is possible to reliably obtain a high resolution image that is bright and has no unevenness.

Moreover, it is preferable that the plate components have a first end portion and a second end portion that is opposite to the first end portion, and that the scatterer move reciprocatingly along the surface of the plate components by turning in an opposite direction at a position of the first end portion and the second end portion.

According to this type of structure, because the scatterer flows identically and uniformly without any unevenness across the entire surface of the screen, it is possible to reliably reduce scintillation.

Moreover, it is preferable that the flow path be formed in the light scattering space by providing a first partition wall that is in contact with the first end portion and extend without making contact with the second end portion, and second partition wall that is in contact with the second end portion and extend without making contact with the first end portion alternately with each other along a flow direction of the scatterer.

According to this type of structure, because the scatterer flows in one direction while passing sequentially between adjacent partitions walls, the scatterer can flow uniformly over the entire surface of the screen without any gaps. Accordingly, it is possible to reliably reduce scintillation.

Moreover, it is preferable that the flow path have a third partition wall that causes the scatterer to flow in a direction that intersects a forward movement direction of the scatterer.

According to this type of structure, because the flow path can be made more intricate, changes in the position of the light scattering material can be increased even if the flow rate of the light scattering material is slow. Accordingly, it is possible to reduce interference fringes using little energy.

Moreover, it is also preferable that the scatterer circulate along a flow path between the light scattering space and the flow device that is provided externally to the light scattering space.

According to this type of structure, because the flow path is closed off, the scatterer can be made to circulate continuously. By ensuring continuous movement of the scattering material (i.e., the light scattering material) in this manner, the effect of suppressing interference is sustained continuously for a long period of time.

Moreover, it is preferable that the plate component that is located closest to a viewer side among the plurality of plate components be a lenticular lens sheet.

According to this type of structure, because it is possible to use an existing lenticular lens sheet, production can be achieved more simply and at a lower cost. By using lenticular lenses instead of a plate component, it becomes unnecessary to stack a separate lenticular lens sheet onto a plate component. As a result, in addition to it becoming possible to reduce costs and improve work efficiency by reducing the number of components, a reduction in screen thickness can also be expected.

Moreover, by installing a screen in which, for example, the longitudinal direction of the lenticular lenses of the lenticular lens sheet is perpendicular to the horizontal direction, the diffusion action in the horizontal direction is heightened and a broader range of vision can be achieved.

Moreover, it is preferable that the plate component that is located closest to a viewer side among the plurality of plate components have a plurality of groove portions that have a semicircular configuration when viewed in cross section and that are all parallel with each other, and that the plate component be formed from a material that has a different index of refraction from that of the scatterer.

According to this type of structure, for example, by setting the index of refraction of the scatterer higher than the index of refraction of the plate components, the same effects can be obtained as when lenticular lenses are used.

Moreover, it is preferable that the flow device be a pump.

According to this type of structure, in addition to it being possible to continuously feed the scatterer at a predetermined flow rate, it is also possible to feed the scatterer at predetermined intervals and the like. Accordingly, the flow state of the scatterer can be suitably modified depending on various prerequisites of the scatterer or changes in the pattern of the interference fringes and the like.

A second aspect of the invention provides a rear projector including: a light source that emits light; an optical modulator that modulates light emitted from the light source; the above described screen; and a projection device that projects light that has been modulated by the optical modulator onto the screen.

According to the second aspect of the invention, because the rear projector is provided with a screen having the above described structure, it is possible to provide a rear projector in which scintillation is reliably reduced, and that can provide a high quality projection image in which the generation of image blurring or ghosting as well as the generation of any glaring are suppressed.

Moreover, a third aspect of the invention provides an image display unit including: a light source that emits light; the above described screen; and a scanning section that scans light that has been emitted from the light source onto the screen.

According to the third aspect of the invention, because the image display unit is provided with the above described screen, it is possible to provide an image display unit in which scintillation has been reduced.

A fourth aspect of the invention provides a screen onto which image light is projected, including: a scatterer that is formed by dispersing a light scattering material in a gas or liquid dispersion medium; a scattering plate that have an internal flow path that allows the scatterer to flow; and a flow device that causes the scatterer to flow through the flow path wherein the scattering plate is formed from an optically transparent material, and a tube that enables the scatterer to circulate through an interior thereof is arrayed in the scattering plate.

According to the fourth aspect of the invention, because a scatterer is made to flow along a flow path in scattering plates by the action of the flow device, the position of the light scattering material within the scattering plates changes from moment to moment in conjunction with the flow of the scatterer. At this time, the scatter state of the projection light that is irradiated onto a predetermined area on the scattering plates undergoes various changes over time. In conjunction with these changes, the visible interference fringes move and the pattern of the interference fringes undergoes intricate changes. As a result, the pattern of the interference fringes is integrally averaged within the residual image duration of the human eye, and the interference fringes (i.e., scintillation) become no longer visible. Accordingly, the interference fringes generated between the screen and a viewer are eliminated, and any glaring disappears. Images created by the projection light can be viewed clearly, and any viewer fatigue is alleviated. Moreover, because the interference fringes can be eliminated without moving the scattering plates in the focusing direction, no image blurring is generated.

In the fourth aspect of the invention, because the flow of a gas or liquid scatterer that contains a light scattering material (i.e., a colloidal fluid) is used, the occurrence of any unpleasant noise is suppressed and it is possible to construct a quiet projection system. Moreover, it is not necessary for a powerful flow device to be used in order to cause the scatterer to flow, so that a large amount of energy does not need to be supplied. Accordingly, this projection system has significantly low energy consumption. Moreover, when considering the structure of the fourth aspect of the invention, because there are fewer wearing portions compared, for example, with a structure in which the scattering plates themselves are moved, this projection system has an excellent durability and high reliability. Furthermore, in the fourth aspect of the invention, when manufacturing scattering plates having an internal flow path, because a flow path can be formed easily by suitably arraying tubes that are formed from a material having optical transparency, production is simplified and it is possible to reduce production costs.

Moreover, it is preferable that, in the scattering plates, a plurality of the tubes be arrayed in parallel with each other within a plane that is perpendicular to the optical axis of the image light.

According to this type of structure, by, for example, preparing a plurality of tubes that each have the same dimensions and lining up the desired number of tubes, it is possible to produce a scattering plate having the desired vertical and horizontal dimensions. As a result, high productivity can be achieved. Moreover, when the tubes are arranged in parallel, because a plurality of tubes can be arranged within a plane with no gaps between them, the scatterer is able to spread across the entire surface of the scattering plates and scintillation can be eliminated across the entire screen.

Alternatively, it is preferable that, in the scattering plate, a tube be bent, and the portions of the tube that are separated by the bent are arrayed in parallel with each other, within a plane that is perpendicular to the optical axis of the image light.

According to this type of structure, because it is possible to produce a scattering plate having predetermined vertical and horizontal dimensions simply by preparing a single tube and altering the positions where this tube is bent or altering the number of rows, a high degree of design freedom is obtained. Moreover, when the tubes are arranged in parallel, because all portions of the tubes can be positioned within a plane with no gaps between them, the scatterer is able to spread across the entire surface of the scattering plate and scintillation can be removed from the entire screen.

Moreover, it is preferable that, in the scattering plate, a plurality of layers of the tube arrays, that are made up of the tubes that are arrayed in parallel with each other within a plane that is perpendicular to the optical axis of the image light, be stacked in the direction of the optical axis of the image light. Namely, instead of a structure in which a tube array that is formed by tubes that are arrayed in parallel with each other is provided in only a single layer, a structure may be employed in which a plurality of such layers are stacked in the direction of the optical axis of the image light.

According to this type of structure, because changes in the scatter state in the tubes of the respective layers overlap the same number of times as the number of layers, the extent of the changes in the scatter state of the light as a whole is greater than when a single layer is used. For example, when the same amount of energy is supplied to the flow device, and either a single layer or a plurality of layers are used, then if the flow rate of the scatterer is the same, the changes in the scatter state of the light are greater when a plurality of layers are used than when a single layer is used. Accordingly, in such cases, the efficiency of the scintillation removal effect relative to the amount of input energy is increased if a plurality of layers is provided.

Alternatively, it is preferable that the tubes that each extends in mutually intersecting directions have a woven net structure. The term 'woven net structure' referred to here describes a structure in which tubes extending in different directions are woven together alternatingly with each other so as to form a flat surface in the manner of weaving a cloth using vertical thread and horizontal thread.

According to this type of structure, for example, it is possible to prepare soft, flexible tubes and manufacture a scattering plate by weaving the tubes together using an existing weaving loom. Moreover, in the same way as the above described structure in which a plurality of layers of tubes are superimposed, the effect is obtained that scintillation can be removed more reliably.

The shape of the tube is optional. For example, the cross section of the tube may be a rectangular cross section or a polygonal cross section, however, it is preferable that the tubes have a circular cross section.

Because the index of refraction of the tubes and the scatterer with which the interior of the tubes have been filled is different from the index of refraction of external air, if the cross-section of the tubes is circular, a convex lens effect is generated on the curved side. As a result of this convex lens effect, image light is concentrated or else dispersed and defused in a suitable spread angle, and this spread angle determines the screen gain. Namely, this scattering plate functions in the manner of a lenticular lens array. Moreover, the spread angle is able to be adjusted by changing the shape of the cross section (i.e., the diameter and the flatness of the circle) of the tube. Namely, by controlling the cross-sectional configuration of the tube, it is possible to obtain the desired screen gain.

Moreover, it is preferable that a light absorbent be provided between the tubes that are mutually adjacent.

According to this type of structure, most external light such as living room illumination that is irradiated onto a screen from the viewing side is absorbed by the light absorbent. As a result, images formed by the image light are projected onto a screen at a high contrast. Furthermore, when this type of structure is combined with a tube shape that generates the above described convex lens effect, because light that has passed through the tubes is condensed by the convex lens effect, the light is able to pass through areas between adjacent light absorbents. Accordingly, the light utilization efficiency is high.

Moreover, it is preferable that the scatterer circulate between the scattering plate and the flow device that is placed externally to the scattering plate.

According to this type of structure, because a closed flow path is constructed, the scatterer can be made to circulate continuously. In this manner, by ensuring a continuous flow of the scatterer (i.e., the light scattering material), the effect of suppressing scintillation is continuously maintained for a long period of time.

Moreover, it is preferable that the flow device be a pump.

According to this type of structure, in addition to it being possible to continuously feed the scatterer at a predetermined flow rate, it is also possible to feed the scatterer at predetermined intervals and the like. Accordingly, the flow state of the scatterer can be suitably modified depending on various prerequisites of the scatterer or changes in the pattern of the interference fringes and the like.

A fifth aspect of the invention provides a rear projector including: a light source that emits light; an optical modulator that modulates light emitted from the light source; the above described screen onto which light that has been modulated by the optical modulator is projected; and a projection device that projects light that has been modulated by the optical modulator onto the screen.

According to the rear projector of the fifth aspect of the invention, because the rear projector is provided with the above described screen of the fourth aspect of the invention, it is possible to provide a rear projector in which no image blurring is generated and scintillation is reliably eliminated, so that a viewer is able to comfortably view images.

A sixth aspect of the invention provides a projection system including: the above described screen; and a projection engine that projects image light onto the screen.

According to the sixth aspect of the invention, because the projection system is provided with the above described screen of the fourth aspect of the invention, it is possible to provide a projection system in which no image blurring is generated and scintillation is reliably eliminated, so that a viewer is able to comfortably view images.

A seventh aspect of the invention provides an image display unit including: a light source that emits light; the above described screen; and a scanning section that scans light that has been emitted from the light source onto the screen.

According to the seventh aspect of the invention, because the image display unit is provided with the above described screen of the fourth aspect of the invention, it is possible to provide an image display unit in which no image blurring is generated and scintillation is reliably eliminated, so that a viewer is able to comfortably view images.

DESCRIPTION OF EXEMPLARY EMBODIMENTS

Figure 1A:
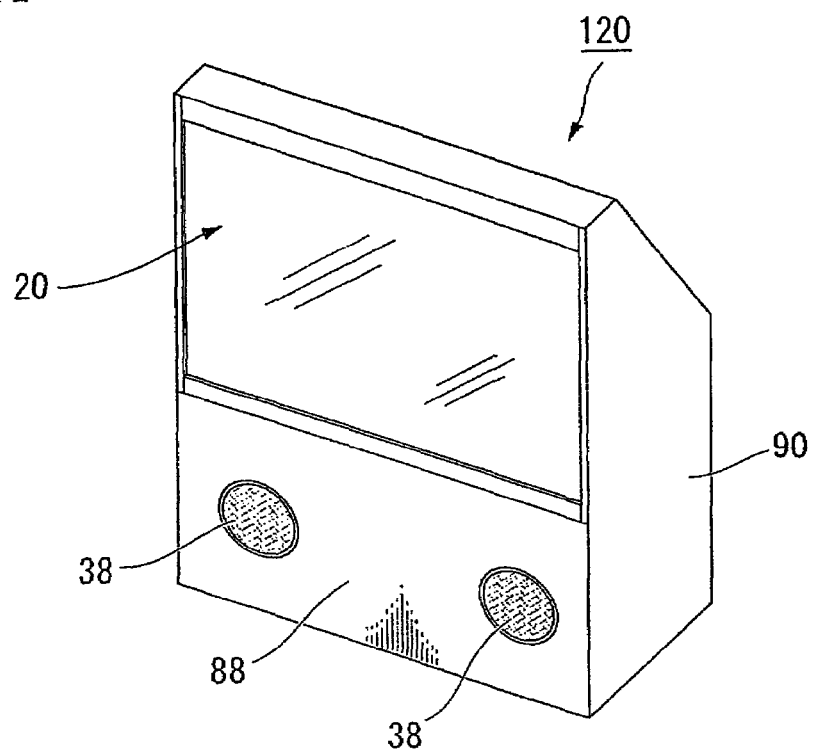
FIGS. 1A and 1B are schematic structural views showing a rear projector according to some embodiments of the invention.

Some embodiments of the invention are described below with reference made to the drawings. Note that in the drawings below, proportions of film thicknesses and dimensions and the like of the respective component elements have been suitably altered in order to make the drawings easier to comprehend. Also, note that in the description of the respective components, the regular directions in which the components are installed when a screen is manufactured are taken as the reference directions thereof. Moreover, in the description given below, an xyz rectangular coordinate system is set, and positional relationships between the respective components are described while referring to this xyz rectangular coordinate system. The horizontal direction on the screen (i.e., the left-right direction as seen by a viewer) is taken as the x direction, the vertical direction on the screen (i.e., the up-down direction as seen by a viewer) is taken as the y direction, and the depth direction of the screen is taken as the z direction.

First Embodiment

Figure 1B:
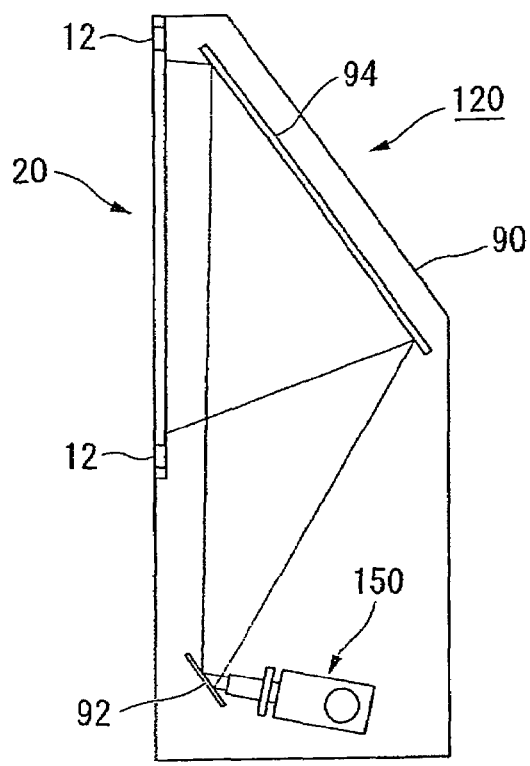

FIG. 1A is a perspective view showing the schematic structure of a rear projector 120 according to the present embodiment, while FIG. 1B is a side cross-sectional view of the rear projector 120 shown in FIG. 1A. The rear projector 120 according to the present embodiment is a rear projection type of projector in which light irradiated from a light source is modulated by an optical modulator, and this modulated light is then enlarged and projected onto a screen 20.

As shown in FIG. 1A, the rear projector 120 is provided with a screen 20 onto which images are projected, and a housing 90 that is mounted on a rear surface side of the screen 20. A front panel 88 is provided in the housing 90 below the screen 20, and aperture portions 38 that output sound from speakers are provided on the left and right sides of the front panel 88.

Next, the internal structure of the housing 90 of the rear projector 120 will be described.

As shown in FIG. 1B, a projection optical system 150 is located in the bottom of the internal portion of the housing 90 of the rear projector 120. Reflective mirrors 92 and 94 are provided between the projection optical system 150 and the screen 20, and light irradiated from the projection optical system 150 is reflected by the reflective mirrors 92 and 94 and is projected in an enlarged form onto the screen 20.

Next, the schematic structure of the projection optical system 150 of the rear projector 120 will be described.

Figure 2:
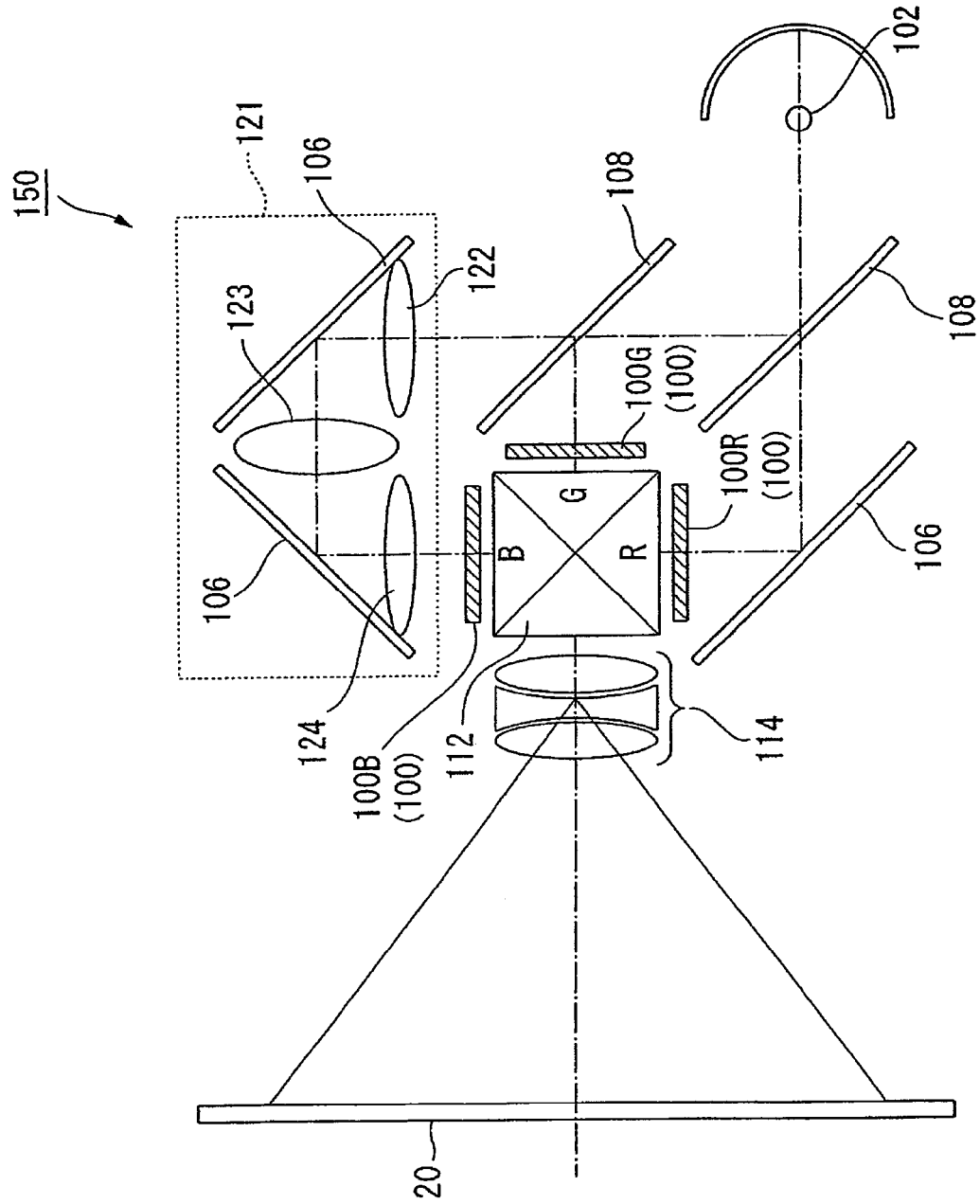
FIG. 2 is a schematic structural view of a projection optical system of a rear projector according to some embodiments of the invention.

FIG. 2 is a schematic view showing the structure of the projection optical system 150 of the rear projector 120. Note that in FIG. 2, in order to simplify the drawing, the housing 90 making up the rear projector 120 has not been shown.

The projection optical system 150 is provided with a light source 102, optical modulators 100 that modulate light irradiated from the light source 102, and a projection lens 114 that projects the light that has been modulated by the optical modulators 100. In the present embodiment, liquid crystal light bulbs 100R, 100G, and 100B are used for the optical modulators 100.

As shown in FIG. 2, the light source 102 that is formed by a white light source such as a halogen lamp is provided in the projection optical system 150. Light irradiated from this light source 102 passes through three internally placed mirrors 106, and is separated by two dichroic mirrors 108 into the three RGB primary colors which are then guided respectively to the liquid crystal light bulbs 100R (red), 100G (green), and 100B (blue) that correspond to the respective primary colors. Here, the liquid crystal light bulbs 100R, 100G and 100B are driven respectively by R, G, B primary color signals that are supplied from an image signal processing circuit (not shown).

Compared with that of the R (red) color and G (green) color, the light of the B (blue) color has a longer optical path. Therefore, in order to prevent a loss in this optical path, the light of the B (blue) color is guided via a relay lens system 121 that is made up of an entry lens 122, a relay lens 123, and an exit lens 124.

The light that has been modulated respectively by the liquid crystal light bulbs 100R, 100G, and 100B enters into a dichroic prism 112 from three directions (i.e., from the liquid crystal light bulbs 100R, 100G, and 100B). The dichroic prism 112 refracts R light and B light 90°, while allowing G light to pass straight through so that the light from the respective light exit portions of the respective liquid crystal light bulbs 100R, 100G, and 100B is synthesized. The synthesized light from the respective light exit portions is then projected via the projection lens 114 onto the screen 20.

Next, the schematic structure of the screen 20 of the rear projector 120 will be described.

Figure 3:
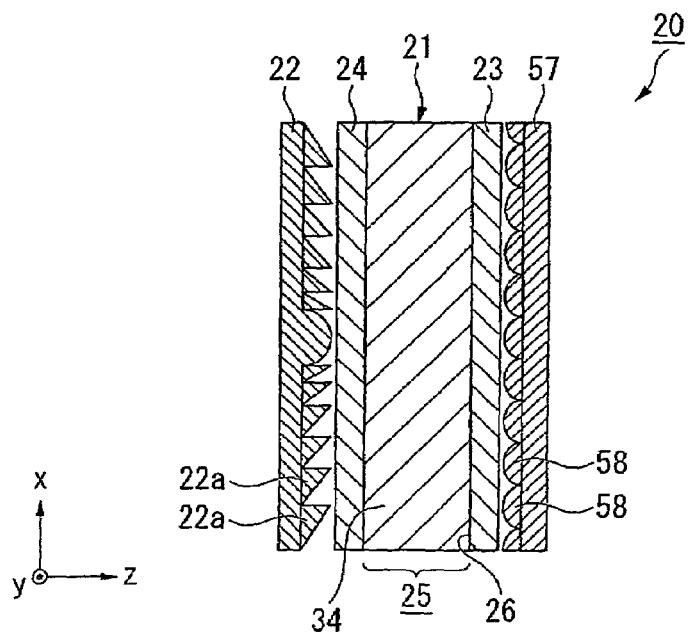
FIG. 3 is a cross-sectional view showing the schematic structure of a screen according to a first embodiment.
Figure 4:
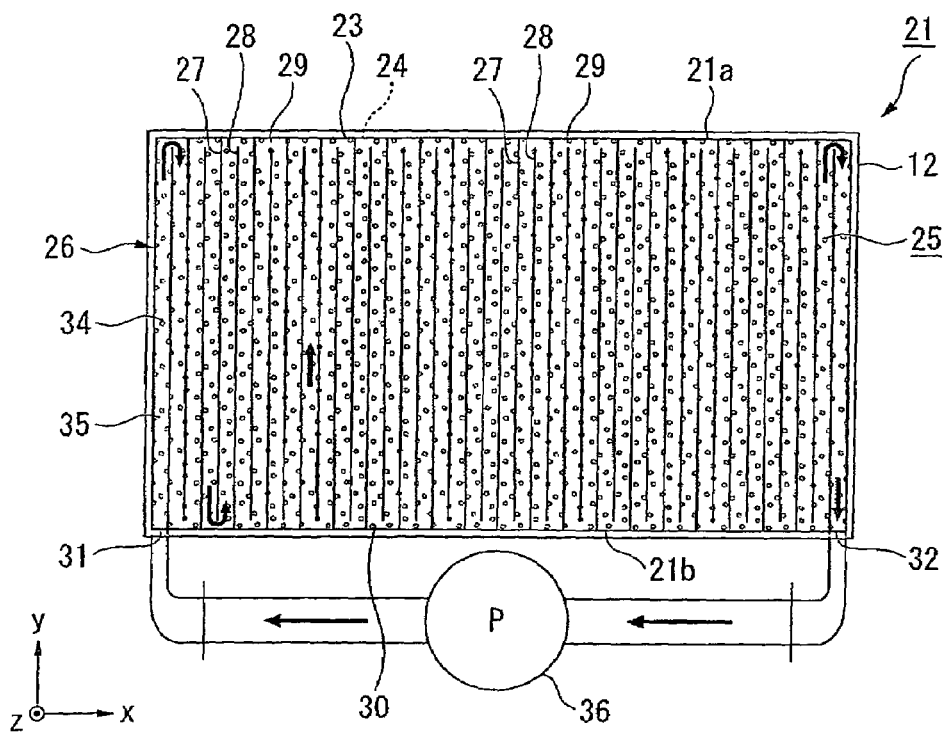
FIG. 4 is a schematic structural view of a screen body according to the first embodiment.
Figure 5A:
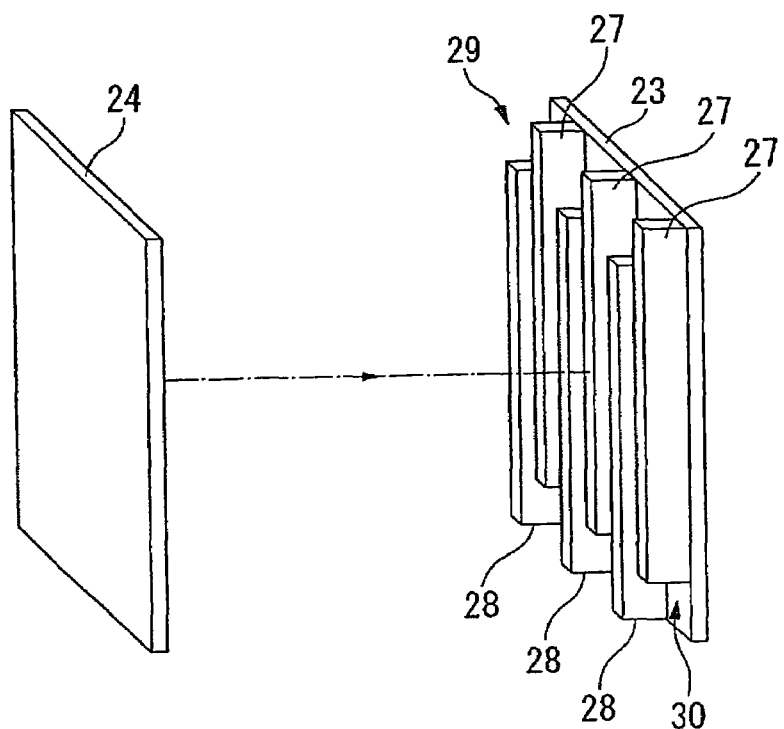
FIGS. 5A and 5B are exploded views of a screen body according to the first embodiment.
Figure 5B:
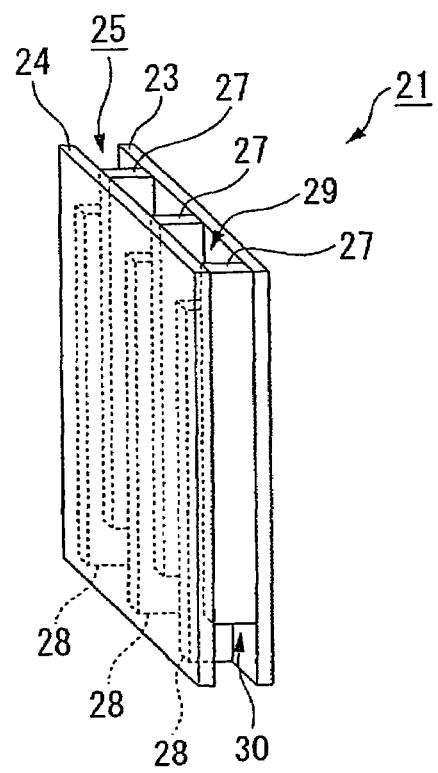

FIG. 3 is a cross-sectional view along the x-z plane, showing the schematic structure of the screen 20 along the focusing direction (i.e., the z direction). FIG. 4 is a schematic structural view of a screen body 21. FIGS. 5A and 5B are exploded views of the screen body 21.

As shown in FIG. 3, the screen 20 is constructed so as to have a screen body 21, a Fresnel lens sheet 22 that has a plurality of Fresnel lenses, and a lenticular lens sheet 57 that has a plurality of lenticular lenses 58, and from the side of a viewer these are stacked on a projected optical path in the sequence of the lenticular lens sheet 57, the screen body 21, and the Fresnel lens sheet 22.

Note that, on the viewer's side of the lenticular lens sheet 57, it is also possible to provide a black mask (not shown) in a lattice form. Furthermore, it is also possible to provide a protective layer on the light exit surface side of the lenticular lens sheet 57. It is possible by doing this to prevent dust and dirt from adhering to the lenticular lens sheet 57 and to prevent the lenticular lens sheet 57 from being scratched.

As shown in FIGS. 3 and 4, the screen body 21 is constructed by placing a pair of optically transparent plate components 23 and 24 that have a rectangular shape when seen in plan view and are large enough to protect a predetermined image area with a predetermined distance apart from each other. The optically transparent plate components 23 and 24 are mounted on a frame 12 with packing (not shown) interposed along each side between the two plate components. The packing is positioned and fixed by the frame 12 in an arrangement in which the packing is sandwiched between the optically transparent plate components 23 and 24. As a result, a space (i.e., a light scattering space) that is enclosed by the optically transparent plate components 23 and 24 and the packing is formed between the optically transparent plate components 23 and 24. The packing also functions as a spacer to control the distance between the optically transparent plate components 23 and 24. Note that plate components that are formed from glass or a transparent resin or the like are used for the optically transparent plate components 23 and 24, and the thickness thereof corresponds to the size of the product in which they are applied.

The screen body 21 has a flow path 26 inside the aforementioned light scattering space 25 and is constructed such that a scatterer 34 flows along the flow path 26 along the surface of the screen 20 (i.e., along the x-y plane). The structure of the flow path is described below in detail.

As shown in FIG. 5A, a plurality of narrow elongated partition walls 27 and 28 are formed in rows on an internal surface of the optically transparent plate component 23 standing upright perpendicularly to the internal surface. In the present embodiment, the longitudinal direction of the partition walls 27 and 28 is aligned with the up-down direction (i.e., the y direction) of the screen 20, and the partition walls 27 (i.e., first partition walls) that are in contact with the top end portion (i.e., the first end portion) of the optically transparent plate component 23 and extend downwards are provided alternatingly at predetermined intervals with the partition walls 28 (i.e., second partition walls) that are in contact with the bottom end portion (i.e., the second end portion) of the optically transparent plate component 23 and extend upwards. These partition walls 27 and 28 are shorter than the length in the up-down direction (i.e., the y direction) of the optically transparent plate component 23 and are also the same length as each other. As a result, by differently placing the partition walls 27 from the placement positions of the adjacent partition walls 28 in the up-down direction, gaps 29 and 30 are created alternatingly facing the left-right direction (i.e., the x direction) of the optically transparent plate component 23. In addition, as shown in FIG. 5B, by adhering the other optically transparent plate component 24 to the optically transparent plate component 23, a flow path 26 (see FIG. 4) is constructed in which an inflow aperture 31 and an outflow aperture 32 (see FIG. 4) that are formed on the two sides of a bottom end portion of the optically transparent plate components 23 and 24 are connected in a waveform shape. In this manner, a flow path 26 such as that shown in FIG. 4 that extends in the left and right directions while turning to the opposite directions at the positions of a top end portion 21*a* or a bottom end portion 21*b* of the screen body 21 is formed on a surface of the screen 20.

The interior of the flow path 26 is filled with a flowing scatterer 34. The scatterer 34 is formed in a colloidal state by, for example, uniformly dispersing spherical light scattering particles 35 (i.e., a light scattering material) in a dispersion medium such as water, and the light scattering particles 35 are able to move in conjunction with the movement of the dispersion medium. Known materials can be used for the light scattering particles 35, such as silicon oxides, alumina, calcium carbonate, glass beads, and copolymers such as acrylic resin bases and the like, or amorphous organic base materials such as silicone resin bases and the like are favorably used. The particle diameter, dispersion concentration, and mass of these fine particles as well as the viscosity and the like of the dispersion medium are appropriately set so as to match the desired product characteristics. The scatterer 34 is moved forward by a pump 36 (i.e., a flow device) that is provided on the path that guides the scatterer 34 flowing out from the outflow aperture 32 of the flow path 26 and flowing back again to the inflow aperture 31, so as to flow along the flow path 26 inside the light scattering space 25. The pump 36 is preferably a quiet rotary pump.

In this manner, the screen body 21 is built such that the scatterer 34 flows in one direction along the flow path 26 inside the light scattering space 25 that is formed between the optically transparent plate components 23 and 24 which are facing each other. As shown in FIG. 4, the scatterer 34 moves along the flow path 26 reciprocatingly in the uptown direction of the screen 20, and flows uniformly without any unevenness from the left side to the right side of the screen body 21 across the entire surface of the screen. As a result, because the scatterer 34 can be made to spread to the entire part of the light scattering space 25, an image represented by the projection light can be fully displayed on the screen 20. Furthermore, because the flow path 26 is closed off, a continuous flow of the scatterer 34 (i.e., the light scattering particles) becomes possible using the pump 36.

The screen 20 that constitutes the above described structure is assembled such that the longitudinal direction of the lenticular lens 58 is perpendicular relative to a horizontal direction. When light is projected onto this screen 20, the scatter state of the projection light is made to undergo various changes over time by the light scattering particles 35 that are moving in conjunction with the flow of the scatterer 34. As a result, any interference fringes of the viewed projection light move and the pattern of the interference fringes change intricately so that, as a result, scintillation is integrally averaged by the residual image effect (i.e., residual image characteristics) of the viewer and, effectively, is reduced.

Residual image characteristics and conditions of the human eye vary from person to person, however, the residual image duration in the brightness of a normal room is generally held to be approximately 20 ms. Because of this, by keeping the flow of the scatterer 34 via the pump 36 so that changes in the positions of the light scattering particles 35 are faster than the residual image duration of the human eye, the light scattering particles 35 can be made to move continuously and at a faster speed than the Brownian motion thereof. In conjunction with this, projection light is scattered by the light scattering particles 35 of the flowing scatterer 34 and is diffracted. The pattern of the interference fringes consequently generated as a result undergoes various changes. Accordingly, when viewed within a visual response time, the interference fringes are averaged out which results in a viewer perceiving the brightness of an image as being uniform. Namely, due to the residual image characteristics of the human eye, the image is placed in a state of being maintained for a predetermined time and the entire screen appears uniformly displayed.

In this manner, any interference fringes become unrecognizable and any sense of glaring in an image is suppressed. This means that scintillation has been reduced, and a high-brightness, high image resolution, high quality image can be obtained. Furthermore, because the scatterer 34 is constantly circulated by the pump 36, the scintillation can be reduced both reliably and over a long term. Accordingly, the entire screen 20 has a uniform brightness and a high quality image having no unevenness in brightness can be obtained. As a result, any stress on a viewer is alleviated and there is no fatigue even after a long viewing time.

Moreover, even if the interference fringes do not change in a fixed pattern, a satisfactory scintillation reduction effect can still be achieved, if the interference fringes having the largest pitch moves in a ratio exceeding the visual response time.

In the present embodiment, because it is possible to cause the light scattering particles 35 to move by simply causing the scatterer 34 to flow using the pump 36, there is no need to actually move the screen itself and scintillation can be effectively reduced at low energy and while generating little noise. Accordingly, it is possible to achieve both a reduction in costs and an improved product performance.

Moreover, because the side circumference of the screen body 21 is enclosed by a frame and a packing and the like, the fluid can be sealed in for a long term without any leakages so that performance stability is secured.

It is also possible to achieve a higher image contrast by using a black mask that is provided in a lattice form. When the lenticular lens sheet 57 is superimposed on the screen body 21, the black mask is placed so as to coincide with positions corresponding to non-light condensing portions of the lenticular lenses 58. Here, if, for example, the pitch between apices of the lenticular lenses 58 is set within a range of 130 to 160 μm, the placement pitch of the black mask ends up corresponding to this.

The light that has been scattered by the scatterer 34 is condensed by the lenticular lens sheet 57 and passes through the gaps in the black mask. Because the black mask performs the function of allowing image light to pass through and only shutting out noise light, it is possible to improve the contrast of an image.

Note that although the shape of the light scattering particles 35 has been made spherical, the aspect of the invention is not limited to this and it is also possible for the shape to be indeterminate.

The basic structure of the rear projector in each of the embodiments described below is the same as that of the first embodiment and only the structure of the screen is different from that of the first embodiment. Accordingly, only the structure of the screen is described below and any description of parts that are common to all embodiments is omitted. Moreover, in FIGS. 6 to 15, component elements that are common to FIGS. 1A to 5B are given the same descriptive symbols.

Note that because the screens of the second and third embodiments are formed by superimposing the same lenticular lens sheet 57 and Fresnel lens sheet 22 as those of the first embodiment on a screen body, in these embodiments only the structure of the screen body is described.

Second Embodiment

Figure 6:
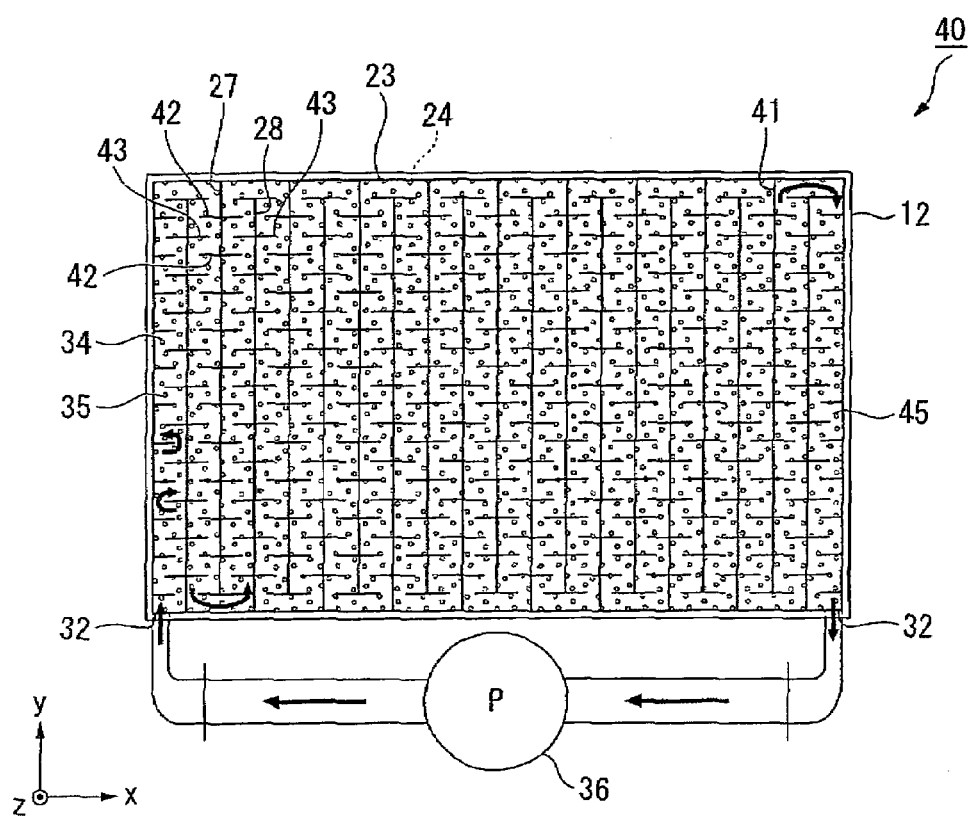
FIG. 6 is a cross-sectional view showing the schematic structure of a screen according to a second embodiment.
Figure 7A:
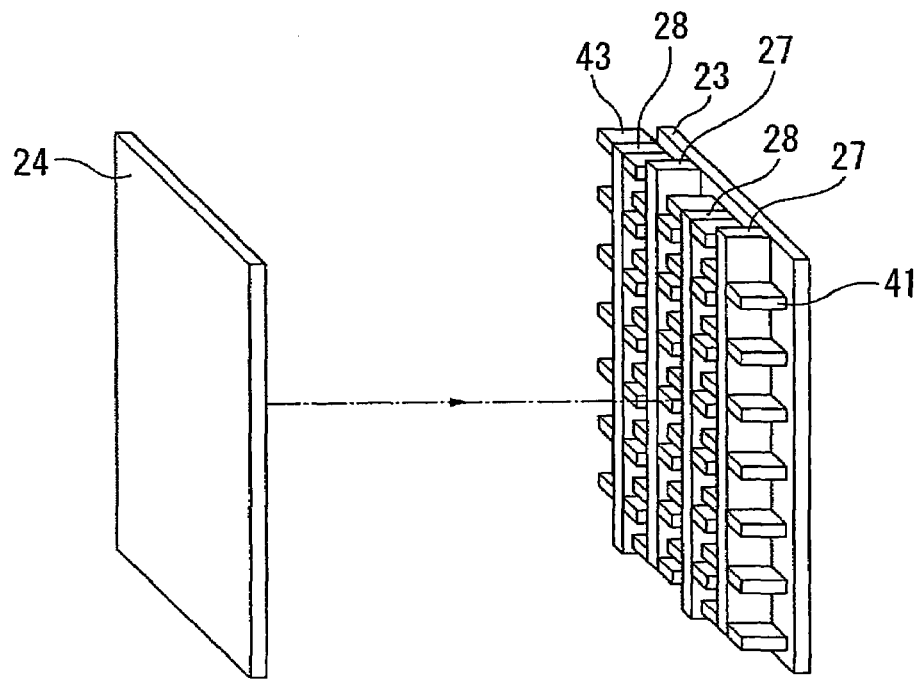
FIGS. 7A and 7B are exploded views of a screen body according to the second embodiment.
Figure 7B:
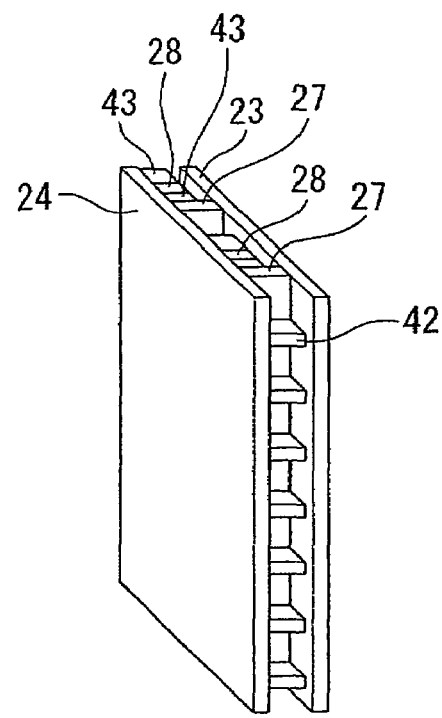

The second embodiment of the invention will now be described with reference made to FIG. 6. FIG. 6 is a schematic structural view of a screen body in the present embodiment. FIGS. 7A and 7B are exploded views of the screen body.

As shown in FIG. 6, a screen body 40 is constructed such that a flow movement is added to the scatterer 34 flowing through a flow path 41 in a direction that is orthogonal to the original flow direction thereof. As shown in FIGS. 6 to 7B, there are provided a plurality of wall portions 42 (i.e., the third partition walls) that are orthogonal to the partition walls 27, and a plurality of wall portions 43 (i.e., third partition walls) that are orthogonal to the partition walls 28. The partition portions 42 and 43 extend perpendicularly in the left and right directions (i.e., in the x direction) from front and rear surfaces of each of the partition walls 27 and 28, and are of a length that ensures that they do not make contact with the facing partition wall 27 or 28. Namely, they have a shorter length than the distance between adjacent partition walls 27 and 28. The partition walls 42 and 43 are located at different positions in the vertical direction (i.e., the y direction) so that, for example, as seen in plan view, the wall portions 43 that are provided on the partition walls 28 are located between the wall portions 42 along the y axis, that are provided on the partition walls 27. Note that distal ends wall portions 42 and 43 that are located on mutually facing partition walls 27 and 28 overlap each other by a suitable amount in the vertical direction. As a result, an even finer and more complex flow path 41 than the flow path 26 of the first embodiment is formed. In this manner, because the wall portions 42 and 43 are located alternatingly in the vertical direction of the screen body 40, when the scatterer 34 is flowing in a left-right direction while moving reciprocatingly in the vertical direction of the screen body 40, a flow that intersects the progressive direction of the scatterer 34 is added thereto.

Accordingly, even if the flow rate of the scatterer 34 is slow, it is still possible to vigorously change the positions of the light scattering particles 35.

According to the present embodiment, even if the pump 36 has a low outflow rate, because there is a large element of randomness in the movement of the light scattering particles 35, it is possible to effectively reduce scintillation with low energy consumption. Accordingly, the utilization of a low-cost small-size pump or micro pump becomes possible and an extended life span of the pump also becomes possible so that a reduction in costs is achieved.

Moreover, it is also possible to provide a reflective membrane on front and rear surfaces of each of the wall portions 42 and 43. In this case, for example, in the screen body 40 shown in FIG. 6, if a space enclosed by adjacent partition walls 27 and 28 and wall portions 42 and 43 is referred to as a 'cell', then the size of a cell 45 is set so as to be equal to or smaller than the size of a pixel. By doing this, between wall portions 42 and 43, namely, in each cell 45, the reflection of light occurs frequently and it is possible to obtain a high contrast image having excellent visibility.

Third Embodiment

Figure 8:
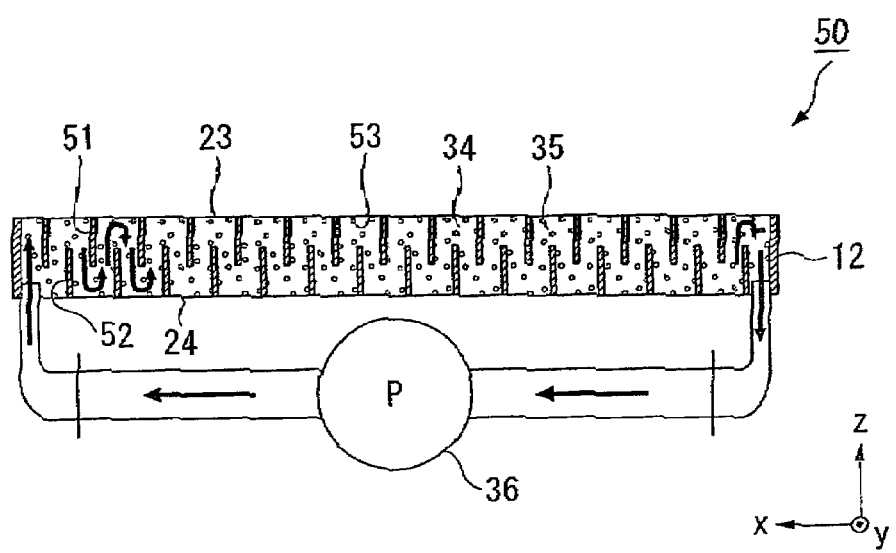
FIG. 8 is a schematic structural view of a screen body according to a third embodiment.

The third embodiment of the invention will now be described with reference made to FIGS. 8 to 9B. FIG. 8 is a cross-sectional view in the focusing direction (i.e., the z direction) of the screen body, while FIGS. 9A and 9B are exploded views of a screen body.

In the screen body 40 of the above described embodiment, the scatterer 34 is flowing in a left-right direction while moving reciprocatingly in the vertical direction of the screen body 40, however, in a screen body 50 of the present embodiment, as shown in FIG. 8, a structure is employed in which the scatterer 34 flows in the left-right direction of the screen body 50 (i.e., the x direction) while moving reciprocatingly in the focusing direction (i.e., the z direction) between facing optically transparent plate components 23.

Figure 9A:
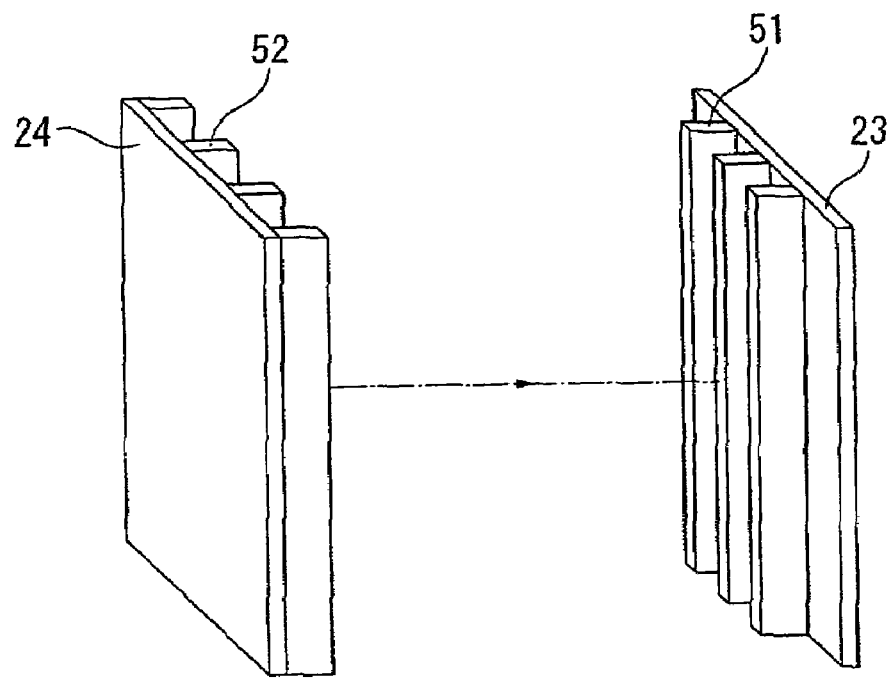
FIGS. 9A and 9B are exploded views of a screen body according to the third embodiment.
Figure 9B:
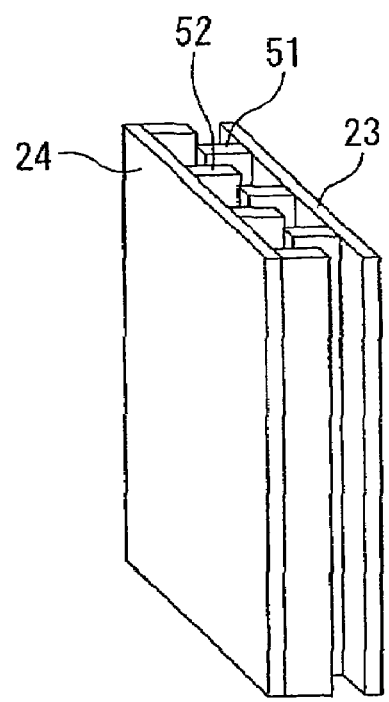

As shown in FIG. 9A, partition walls 51 and 52 of the present embodiment have the same length as each other and the length in the longitudinal direction thereof matches the length in the vertical direction of the optically transparent plate components 23 and 24. The partition walls 51 are provided on the optically transparent plate components 23, while the partition walls 52 are provided on the optically transparent plate components 24, and the interval between placement positions of the respective partition walls 51 is the same as the interval between placement positions of the respective partition walls 52. However, because the partition walls 51 and 52 are placed in different placement positions from each other in the left-right direction of the screen body 50, as shown in FIG. 9B, when the optically transparent plate components 23 and 24 are assembled together, the partition walls 51 and 52 are provided alternately in the left-right direction of the screen body 50.

Specifically, the partition walls 52 of the optically transparent plate component 24 are located in between adjacent partition walls 51 of the facing optically transparent plate component 23. The optically transparent plate components 23 and 24 are assembled without distal ends of the partition walls 51 and 52 being in contact with the internal surface of the respective facing optically transparent plate component 24 and 23, and the distal ends of the partition walls 51 and 52 overlap each other when viewed from the placement direction (i.e., the x direction) by a suitable amount. It is preferable that the extent of this overlapping be appropriately set so as to create a uniform flow path width so that the scatterer 34 flows at a constant speed. In this manner, a flow path 53 is formed on the internal surfaces of the optically transparent facing plate components 23 and 24 that extends in the left-right direction while turning reciprocatingly back and forth, and the scatterer 34 with which the interior of the flow path 53 has been filled, flows in the left-right direction (i.e., the x direction) while moving reciprocatingly in the focusing direction along the flow path 53. In the present embodiment as well, because it is possible to achieve the same action as in the above described embodiments, scintillation can be effectively reduced.

In each of the above described embodiments a description is given of a screen that necessitates that lenticular lenses be stacked on the screen body. In the embodiment described below, a description is given assuming that lenticular lenses are not stacked on a screen body, but configured so that the screen body is endowed with the functions of the lenticular lenses. Note that the Fresnel lens sheet 22 is superimposed in the same way as in the above described embodiments. Moreover, it is also possible not to use packing, but to join the optically transparent plate components 23 and 24 together using the partition walls so as to form a light scattering space.

Fourth Embodiment

The fourth embodiment of the invention will now be described with reference made to FIGS. 10 and 11.

Figure 10:
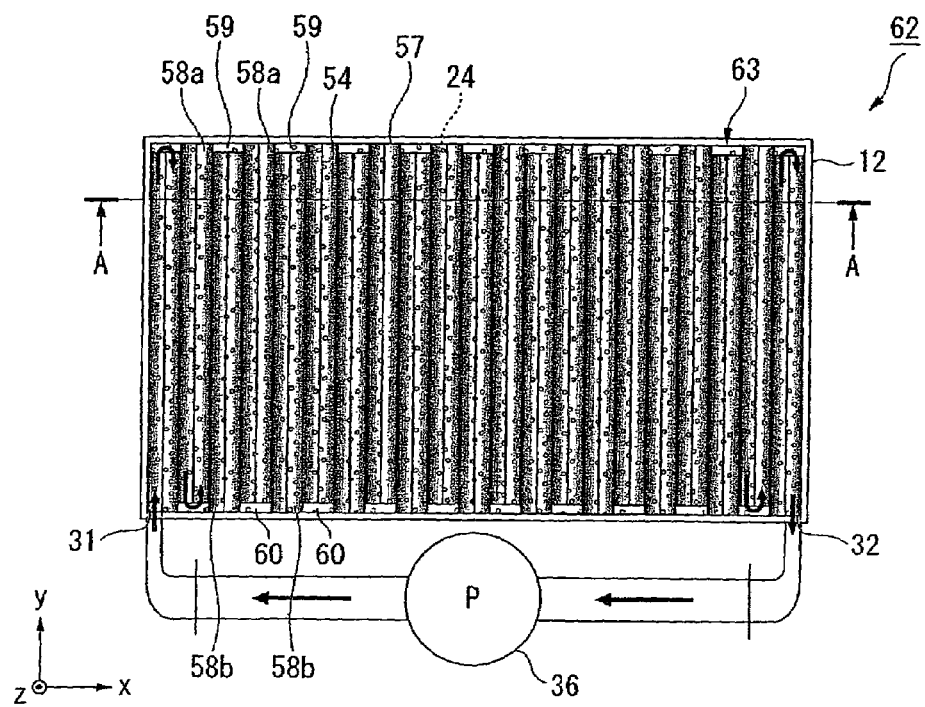
FIG. 10 is a schematic structural view of a screen body according to a fourth embodiment.
Figure 11:
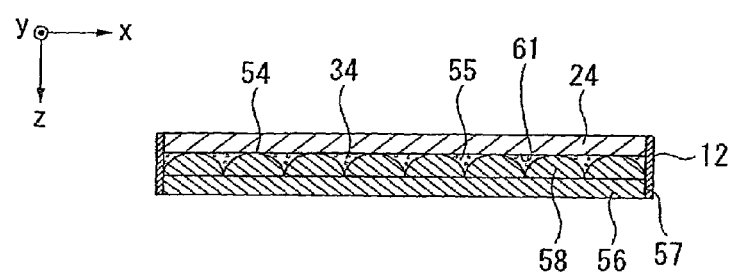
FIG. 11 is a cross-sectional view taken along the line A-A in FIG. 10.

FIG. 10 is a schematic structural view of a screen body according to the present embodiment, while FIG. 11 is a cross-sectional view taken along the line A-A in FIG. 10.

The present embodiment differs from the above described embodiments in that a lenticular lens sheet is used instead of one of the optically transparent plate components.

As shown in FIG. 10, in a screen body 63 of the present embodiment, a known lenticular lens sheet that is formed by providing a plurality of lenticular lenses 58 in parallel on one surface of a transparent substrate 56 is employed as a lenticular lens sheet 57. These lenticular lenses 58 are placed contiguously with each other in the direction in which they are aligned in parallel. In addition, in order to vary the height positions of both end portions of adjacent lenticular lenses 58 in the vertical direction, the length in the vertical direction of each lenticular lens 58 is individually adjusted. As a result, gaps 59 and 60 are formed alternately in the left-right direction of the lenticular lens sheet 57. Specifically, first lenticular lenses 58a extend so as to be in contact with a top end portion 57a of the lenticular lens sheet 57, while second lenticular lenses 58b extend so as to be in contact with a bottom end portion 57b of the lenticular lens sheet 57.

As shown in FIG. 11, by adhering the optically transparent plate component 24 onto the lenticular lens 58 side of the lenticular lens sheet 57, a flow path 61 is formed using gaps 55 that are formed between the lenticular lens sheet 57 and the optically transparent plate component 24.

Namely, as shown in FIGS. 10 and 11, by adhering together the optically transparent plate component 24 and the lenticular lens sheet 57, all of the gaps 55 that are formed between each of adjacent lenticular lenses 58 and optically transparent plate components 24 are connected via the gaps 59 and 60 that are formed in the top and bottom directions of the lenticular lens sheet 57. As a result, a flow path 61 is formed that extends in the left-right direction while turning reciprocatingly back and forth at top end portions 63a and bottom end portions 63b of the screen body 63, and the scatterer 34 with which this flow path 61 has been filled flows in the left-right direction (i.e., the x direction) while moving reciprocatingly in the up-down direction (i.e., the y direction) of the screen body 63 following this path. Note that because the contact points between the optically transparent plate component 24 and the lenticular lenses 58 are fixed such that the optically transparent plate component 24 attaches at the apices of the lenticular lenses 58, fastening portions 54 can be kept to a minimum, and there is no possibility that the display of an image will be affected.

In this manner, by using the lenticular lens sheet 57 instead of one of the optically transparent plate components, it is not necessary to stack a separate lenticular lens sheet 57 on the screen body 63. Because it is possible, as a result, to reduce the thickness of the screen overall, the size and weight of a product can be decreased. Moreover, by using an existing component for the lenticular lens sheet 57, the number of components can be reduced and costs can be lowered. In addition, because there is no need to provide a separate lenticular lens sheet 57, the work process is reduced and production efficiency is improved.

Note that in the above description, the gaps 55, that are formed between adjacent lenticular lenses 58 and optically transparent plate components 24, are joined together by adjusting length in the longitudinal direction of the lenticular lenses 58. However, if these gaps 55 are connected so as to form a single direction path, then it is possible for another method to be used. Moreover, it is also possible for the optically transparent plate component 24 not to be adhered to the lenticular lens sheet 57, but to join the two tightly together by compressing them.

Furthermore, it is also possible to employ a lenticular lens sheet that is formed by dispersing light scattering particles throughout the interior thereof. This results in scattered light, that has been scattered by the scatterer 34 flowing along the flow path 61 and by the light scattering particles contained in the lenticular lens sheet, being complexly deflected, and the interference fringe pattern changes in various ways. As a result, the effect of reducing scintillation is obtained. It is also possible to use a fly-eye lens instead of the lenticular lens sheet 57.

Fifth Embodiment

The fifth embodiment of the invention will now be described with reference made to FIGS. 12 to 14B.

Figure 12:
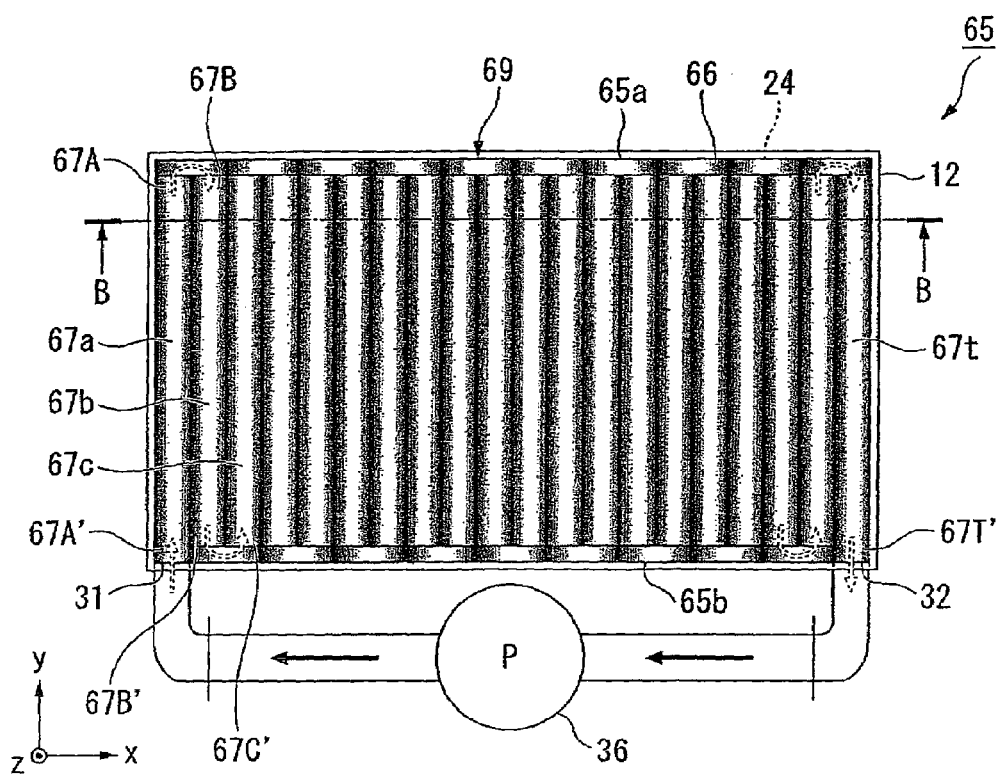
FIG. 12 is a schematic structural view of a screen body according to a fifth embodiment.
Figure 13:
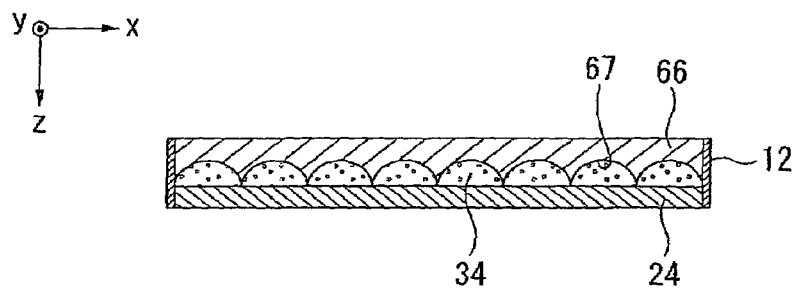
FIG. 13 is a cross-sectional view taken along the line B-B in FIG. 12.
Figure 14A:
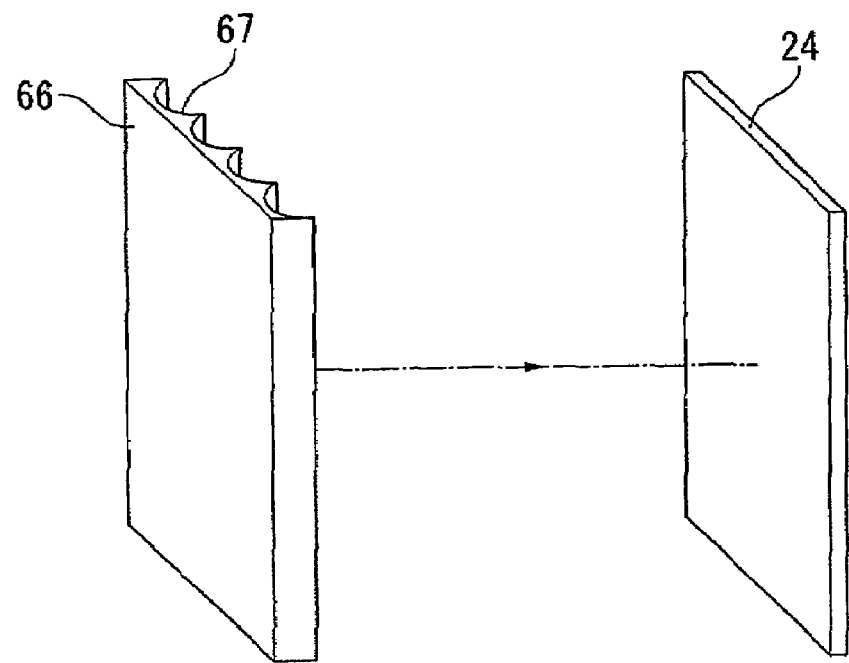
FIGS. 14A and 14B are exploded views of a screen body according to the fifth embodiment.
Figure 14B:
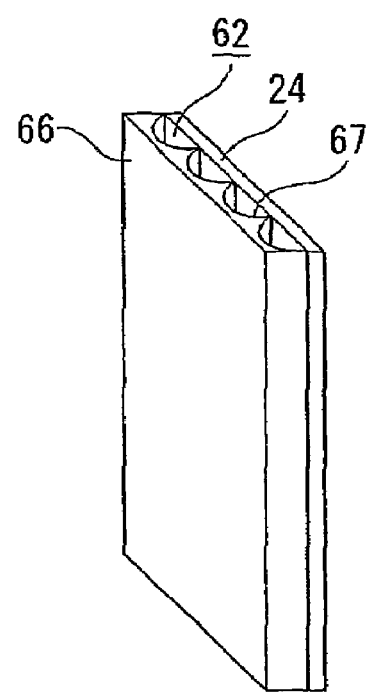

FIG. 12 is a schematic structural view of a screen body according to the present embodiment, while FIG. 13 is a cross-sectional view taken along the line B-B in FIG. 12, and FIGS. 14A and 14B are perspective views of a screen body. The present embodiment differs from the above described fourth embodiment in that a light scattering and condensing plate component 66 is used instead of a lenticular lens sheet.

As shown in FIGS. 13 and 14A, a plurality of groove portions 67, having a semicircular cross section that are recessed from one side in the thickness direction of the light scattering and condensing plate component 66 and extend in the vertical direction (i.e., the y direction) of the plate component, are lined up in the left-right direction in the light scattering and condensing plate component 66. The concave shape of the groove portions 67 simulates the convex shape of the lenticular lenses 58 used in the above described embodiment. As shown is FIG. 12, the two end portions of each groove portion 67 are connected respectively to one end portion of different adjacent groove portions 67, and are alternately connected through the left-right direction of the screen body 65. Specifically, an end portion 67A of a groove portion 67a which is located on the left side of the drawings and whose other end portion 67A' forms the inflow aperture 31 is connected to an end portion 67B of the adjacent groove portion 67b. Moreover, an end portion 67B' of the groove portion 67b is connected to an end portion 67C' of the adjacent groove portion 67c on the opposite side from the groove portion 67a. The two end portions of the subsequent respective groove portions 67d, e, f, . . . as well are alternatingly connected in the same way, and a bottom end portion 67T' of a groove portion 67t that is located on the right in the drawing forms the outflow aperture 32.

As shown in FIGS. 14A and 14B, by adhering the optically transparent plate component 24 to the light scattering and condensing plate component 66, a flow path 69 is formed that connects the inflow aperture 31 and the outflow aperture 32 in a waveform shape. The flow path 69 utilizes gaps 62 that are formed between the optically transparent plate components 24 and the groove portions 67, and extend in the left-right direction while turning back on themselves at top end portions 65a or bottom end portions 65b of the screen body 65.

It is also possible to construct a screen that fulfills the same functions as the lenticular lenses 58 when the flow path 69 having the above described structure is filled with the scatterer 34. This can be achieved by differentiating the index of refraction of the scatterer 34 from the index of refraction of the light scattering and condensing plate component 66. Because the screen body 65 is placed such that the optically transparent plate component 24 faces towards the viewer side, for example, by setting the index of refraction of the scatterer 34 higher than the index of refraction of the light scattering and condensing plate component 66, in the same way as the lenticular lens sheet 57, it is possible to diffuse light within a predetermined range, and it is possible to effectively reduce scintillation.

In the above described first through fourth embodiments, the lenticular lens sheet 57 is employed in the screen structure in order to obtain an optional screen gain. Screen gain (Gs) represents the ratio of luminance relative to a gain of 1 (i.e., a reference value) which is the luminance when light is irradiated onto a standard white board. A screen that has a screen gain of 1 can be viewed at the same brightness from any direction. However, because it is difficult to apply an external light removal structure to this total scattering type of screen, there is a possibility of image blurring occurring and the contrast being low.

Because of this, in the above described embodiments, by using the lenticular lens sheet 57, it is possible to diffuse light in a predetermined angular range and achieve a higher contrast. In addition, the structure uses the flowing scatterer 34 to reduce any interference fringes which are easily generated as a result of this. By employing this type of structure, the gain of the screen is increased to more than 1 and there is an increase in gain (i.e., an increase in contrast). Controlling the screen gain becomes possible by changing the thickness of the lenticular lens sheet 57. More specifically, the refractive power of the lenses can be set to a desired value by changing the radius of the lenticular lenses 58. Accordingly, it is possible to set the light diffusion angle to an optional angle. The light diffusion angle referred to here corresponds to the screen gain value.

In the fifth embodiment, functions of the lenticular lenses are imparted to the screen body 65 and control of the screen gain in this structure is possible via the design of the shape of the flow path 69. Because the cross-sectional shape of the flow path 69 is a semicircle, a screen having a desired gain can be obtained by altering the radius in cross-sectional view of the flow path 69. In addition to altering the design of the shape of the flow path 69, the gain can be adjusted by altering the settings of the index of refraction of the scatterer 34 (i.e., the average index of refraction). Accordingly, controlling the screen gain can be performed more simply and more effectively.

According to the above described screen body structure, it is possible to improve the screen gain and form a screen in which the desired brightness is secured. Moreover, in spite of the screen being a high gain screen, because a structure is employed in which an interference fringe can be changed rapidly while the projection light is being condensed, scintillation can be considerably reduced. Accordingly, it is possible to eliminate interference fringes and reduce scintillation, and obtain a screen having excellent viewability by eliminating display unevenness and glaring.

Sixth Embodiment

Next, the present embodiment will be described with reference made to the drawings.

The present embodiment is an image display unit that uses a scanning section instead of an optical modulator. Note that because the structure of the remainder of the screen is the same as that of the above described first embodiment, the same descriptive symbols are given to common component elements and a detailed description thereof is omitted.

Figure 15:
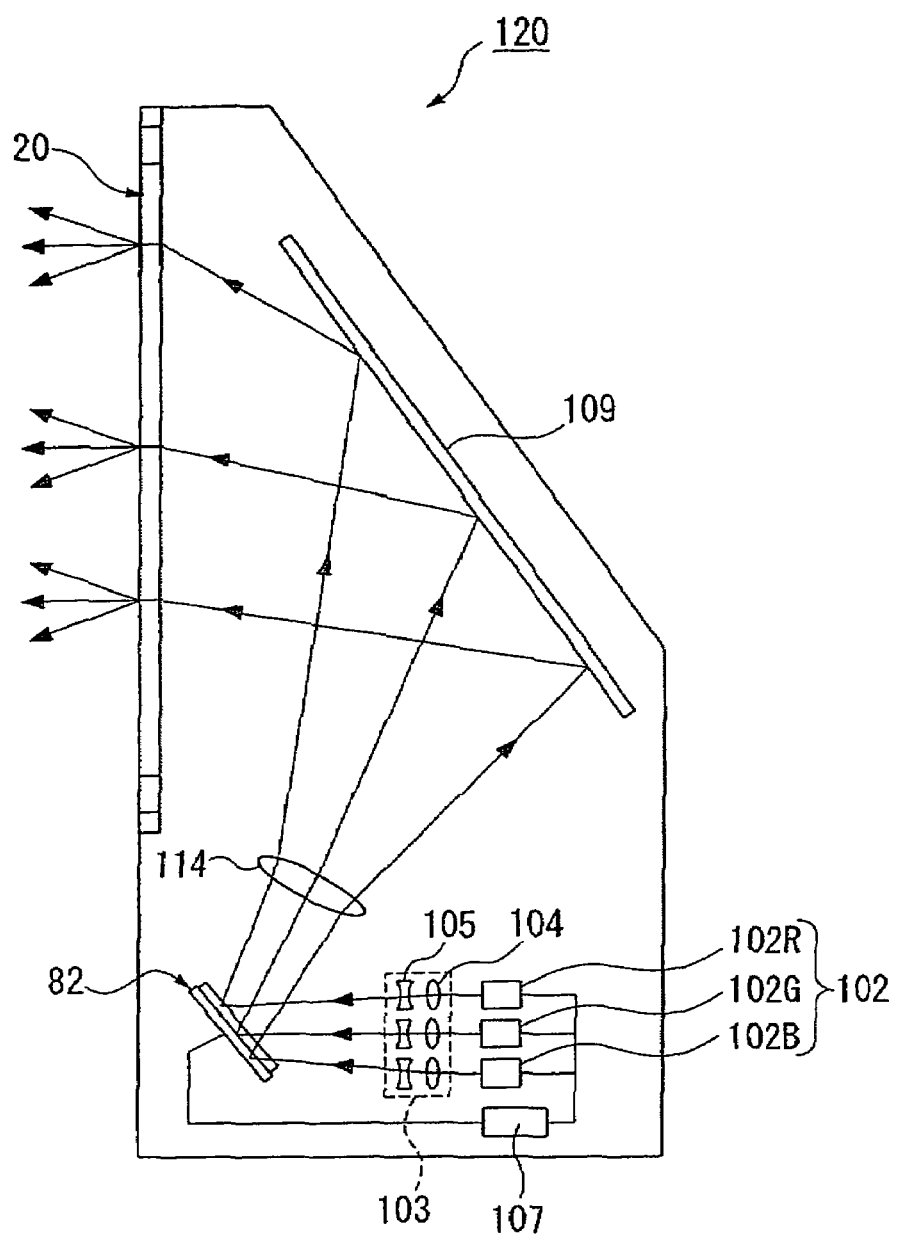
FIG. 15 is a schematic structural view of a rear projector according to a sixth embodiment.

FIG. 15 is a cross-sectional view showing the schematic structure of a rear projector 120 (i.e., an image display unit).

As shown in FIG. 15, the rear projector 120 of the present embodiment is provided with a light source 102 that irradiates laser light, a lens optical system 103 that includes a collimator optical system 104 and a beam shaping optical system 105, a scanner 82 that causes the irradiated laser light scan in a two-dimensional direction, a projection lens 114 that enlarges and projects scanned light, and a reflective mirror 109 that reflects projected light towards the screen 20. The light source 102 has a red laser diode 102R that irradiates red laser light, a green laser diode 102G that irradiates green laser light, and a blue laser diode 102B that irradiates blue laser light.

Laser light that has been irradiated from the laser diodes 102R, 102G, and 102B is input into the scanner 82 via the lens optical system 103. This input laser light scans in a two-dimensional direction via the scanner 82 and is then projected onto the screen 20 via the projection lens 114 and the reflective mirror 109. In this manner, the rear projector 120 of the present embodiment forms an image by causing laser light irradiated from the light source 102 to be scanned onto the screen 20 by the scanner 82.

The scatterer 34 which contains the light scattering particles 35 may also be applied to flow inside the screen 20 in a scanner type rear projector 120 which uses a laser light source such as the present embodiment. Therefore the same operation and effects as in the above described embodiments can be obtained, and it is possible to effectively reduce scintillation.

Examples of favorable embodiments of the invention have been illustrated above with reference made to the attached drawings, however, it is to be understood that the aspect of invention is not limited to these examples. The various configurations and combinations and the like of the respective component elements illustrated in the above described examples are simply examples thereof, and various modifications may be made thereto based on design requirements and the like insofar as they do not depart from the spirit or scope of the aspect of invention.

In the above described embodiments, the screen 20 having the above described structure is employed in the rear projector 120, however, it can also be employed in a screen of a front projection type of projector.

Furthermore, in the above described embodiments, an example is given in which transmitting type liquid crystal light bulbs are used for the optical modulators, however, it is possible to use reflective type liquid crystal light bulbs and micro mirror array devices for the optical modulators. At this time, the structure of the projection optical system can be altered as is appropriate.

Moreover, in addition to the structures described above, the method used to form the flow path may also be one in which optically transparent plate components having grooves that have been formed by etching, pressing, injection molding or a cutting process or the like and then adhered together.

Moreover, flow paths are constructed in which the flow direction of the scatterer 34 is a flow in the left-right direction while moving reciprocatingly in the up-down direction of the screen, however, it is also possible to form a flow path in which the flow direction is a flow in the up-down direction while moving reciprocatingly in the left-right direction of the screen. In either case, if the flow path is constructed such that the scatterer 34 flows along the surface of the screen (i.e., the x-y plane), then scintillation can be effectively reduced.

In the above description, a flow path is provided that enables a scatterer to flow between a pair of optically transparent plate components, however, it is also possible to stack a plurality of optically transparent plate components and to form flow paths between the base plates, respectively.

Furthermore, the diameter, index of refraction, placement density and the like of the light scattering particles 35 may be appropriately adjusted. By using water, for example, as the dispersion medium, a reduction in costs can be achieved while reducing the environmental impact.

Seventh Embodiment

The seventh embodiment of the invention will now be described with reference made to FIG. 16 through FIG. 23.

Figure 16:
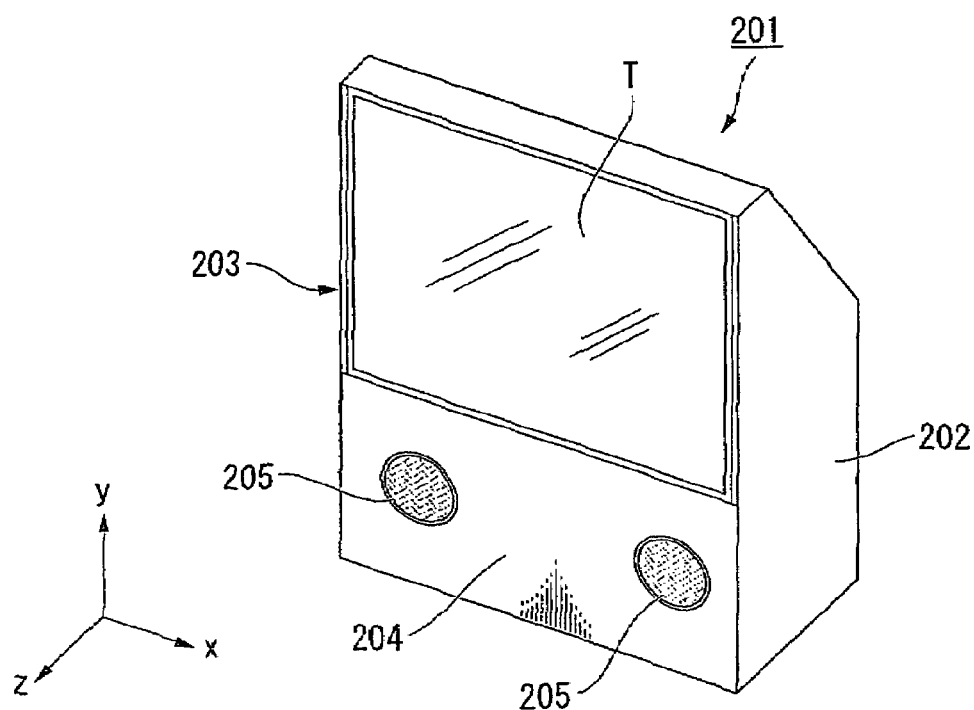
FIG. 16 is a perspective view showing the structure of a rear projector according to a seventh embodiment of the invention.
Figure 17:
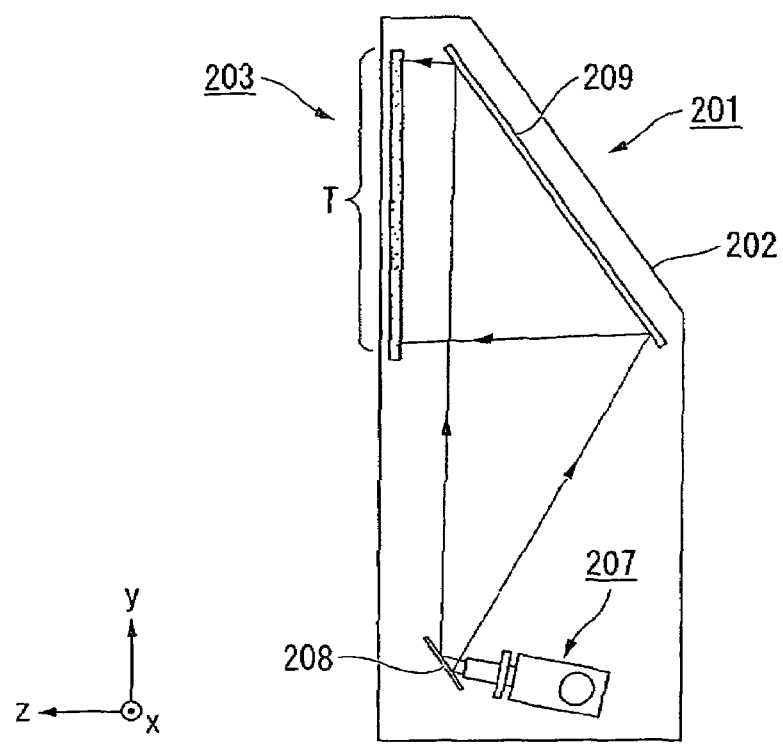
FIG. 17 is a side cross-sectional view of a rear projector of the seventh embodiment.
Figure 18:
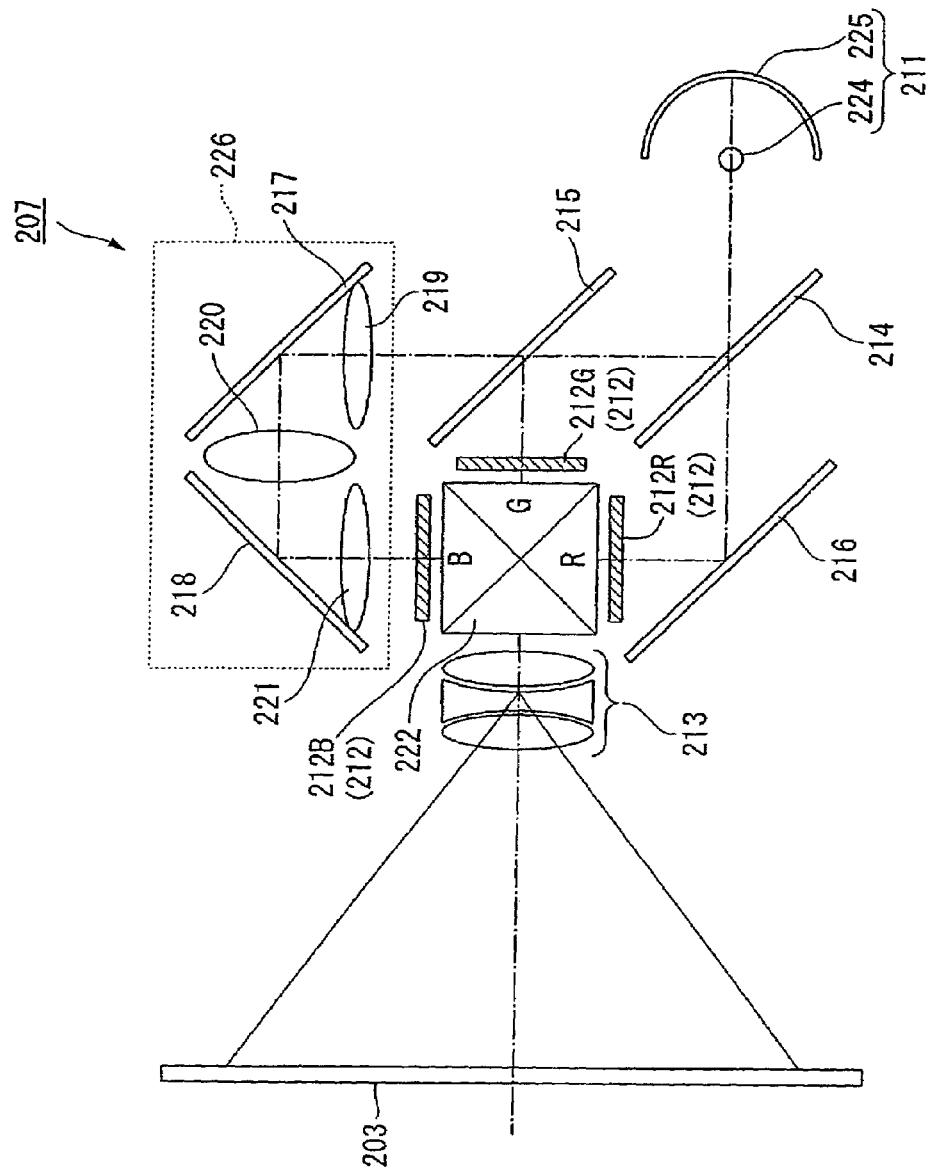
FIG. 18 is a schematic structural view of an optical system of a projection engine of a rear projector of the seventh embodiment.
Figure 19:
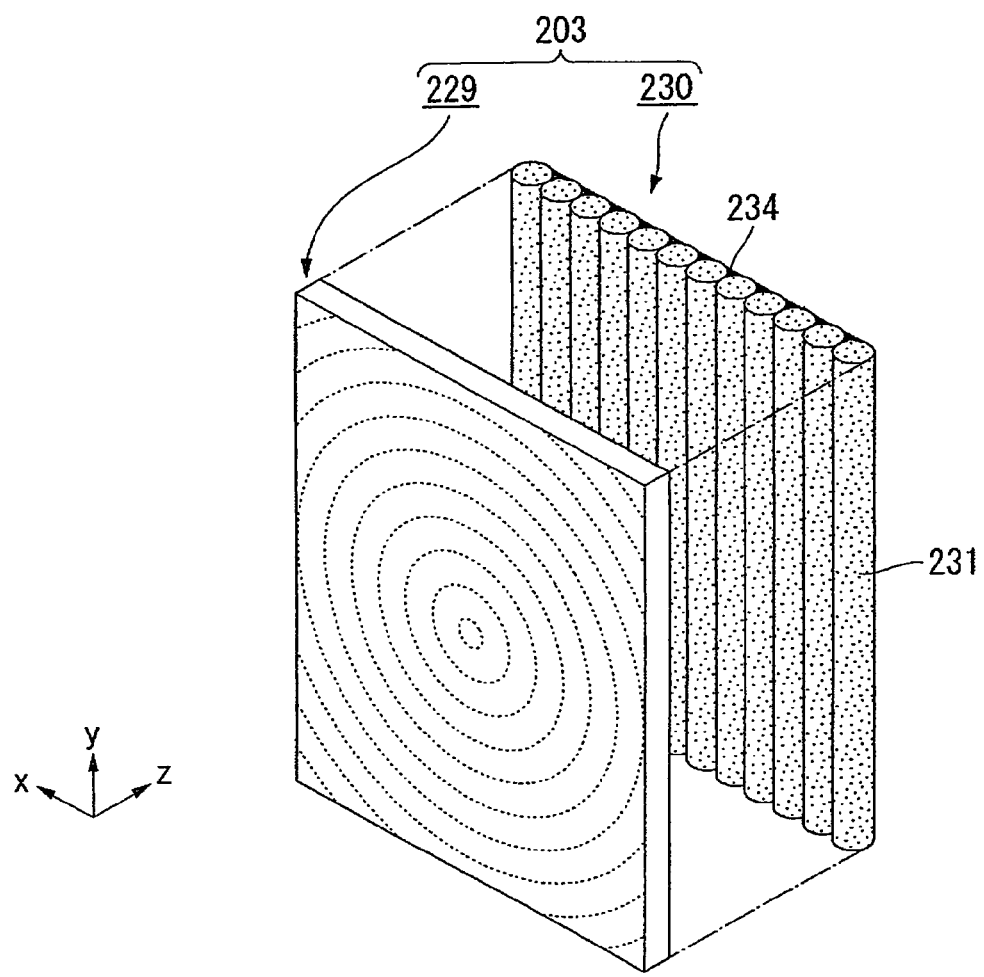
FIG. 19 is a perspective view showing an exploded state of a screen of a rear projector of the seventh embodiment.
Figure 20A:
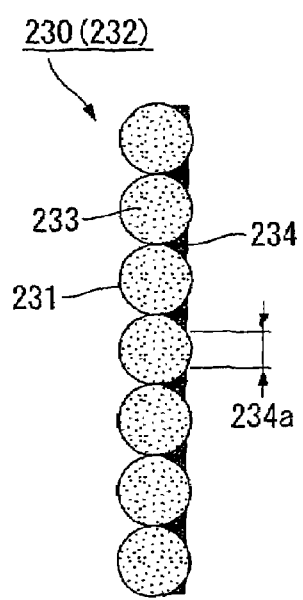
FIGS. 20A and 20B are cross-sectional views of a scattering plate that constitutes the screen of the seventh embodiment.
Figure 20B:
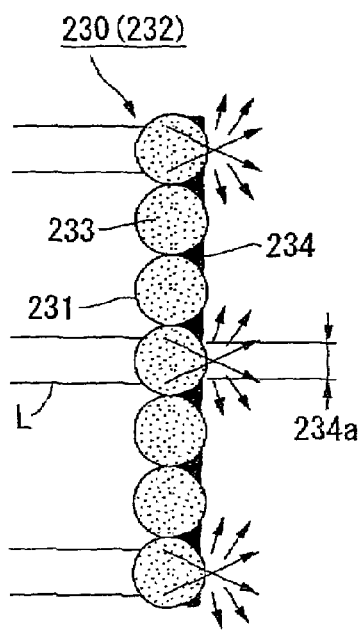
Figure 21:
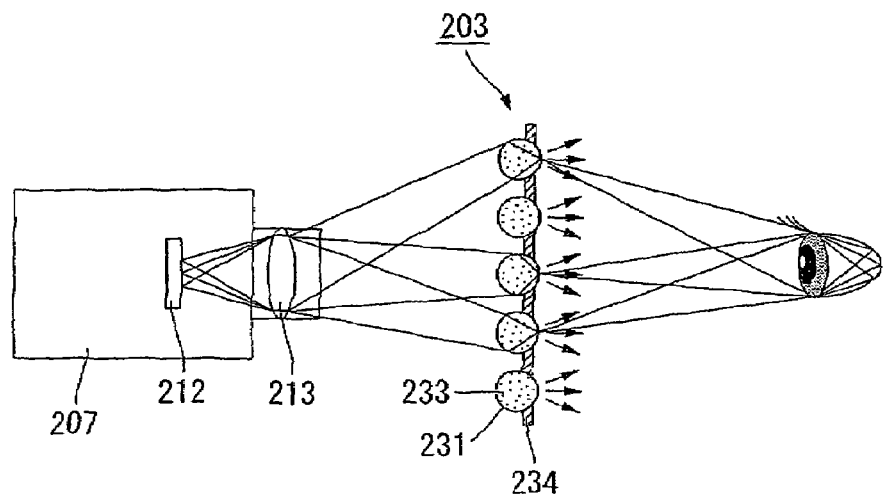
FIG. 21 is a view to illustrate the operation of the scattering plate of the seventh embodiment.
Figure 22:
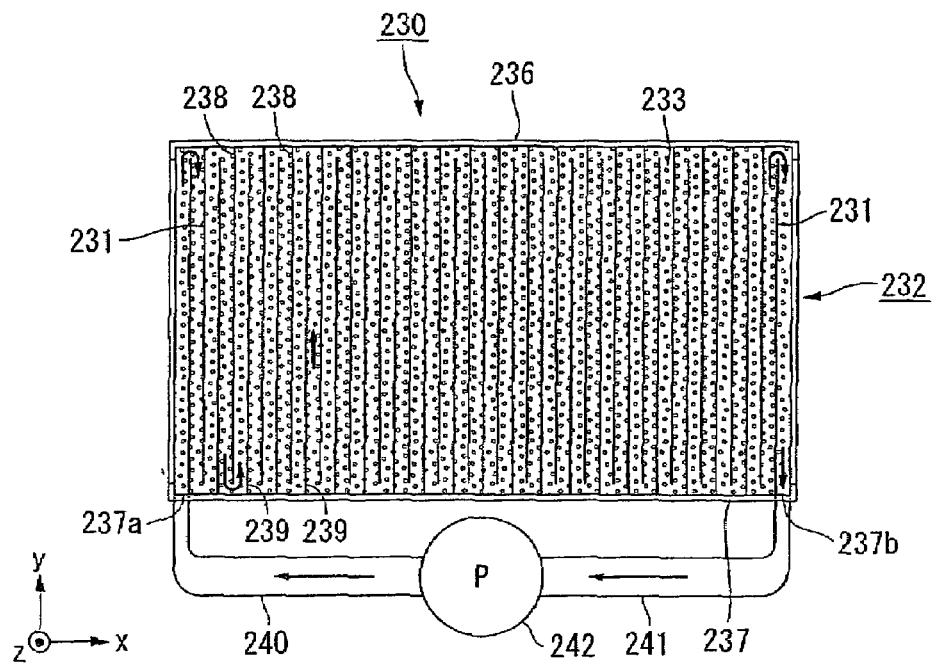
FIG. 22 is a schematic structural view of an entire screen including a pump (i.e., a flow device).
Figure 23:
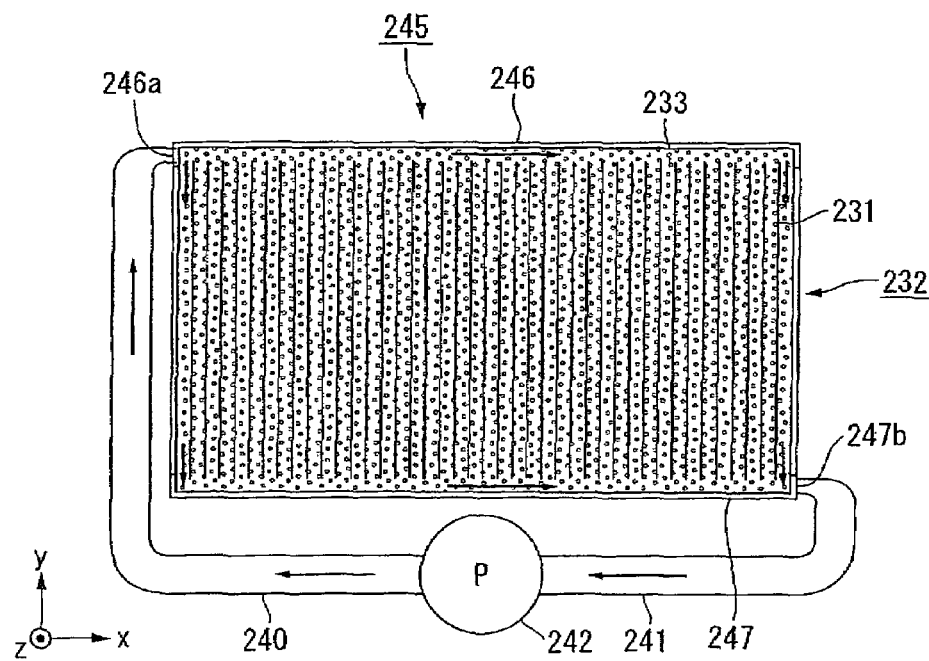
FIG. 23 is a variant example of a schematic structural view of an entire screen of the seventh embodiment.

FIG. 16 is a perspective view showing the schematic structure of a rear projector according to the present embodiment. FIG. 17 is a side cross-sectional view of the rear projector of the seventh embodiment. FIG. 18 is a schematic view showing the structure of an optical system of the rear projector of the seventh embodiment. FIG. 19 is a perspective view of a screen of the rear projector of the seventh embodiment. FIGS. 20A and 20B are cross-sectional views of a scattering plate that constitutes the screen of the seventh embodiment. FIG. 21 is a view to illustrate an action of the scattering plate. FIG. 22 is a schematic structural view of an entire screen including a pump (i.e., a flow device). FIG. 23 is a variant example of a schematic structural view of an entire screen.

In the drawings referred to below, proportions of film thicknesses and dimensions and the like of the respective component elements have been suitably altered in order to make the drawings easier to see.

The rear projector according to the present embodiment is a rear projection type of projector in which light irradiated from a light source is modulated by an optical modulator, and this modulated light is then enlarged and projected onto a screen. As shown in FIG. 16, the rear projector 201 is provided with a housing 202 and a screen 203. The screen 203 is mounted on a front surface side of the housing 202, and image light is projected from the rear surface side of the screen 203 so that a viewer positioned on the front surface side of the screen 203 is able to view images. A front panel 204 is provided in the front surface of the housing 202 below the screen 203, and aperture portions 205 that output sound from speakers (not shown) are provided on the left and right sides of the front panel 204.

Next, the internal structure of the housing 202 will be described.

As shown in FIG. 17, a projection engine 207 is located in the bottom of the internal portion of the housing 202. A reflective mirror 208 and a reflective mirror 209 are provided on an optical path between the projection engine 207 and the screen 203. By employing this structure, light irradiated from the projection engine 207 is reflected by the reflective mirrors 208 and 209 and is projected in enlarged form onto a projection area T on the screen 203.

Next, the schematic structure of the projection engine 207 will be described using FIG. 18.

Note that, in FIG. 18, in order to simplify the drawing, the housing 202 constituting the external appearance of the rear projector 201 has not been shown.

The projection engine 207 is provided with a light source 211, optical modulators 212 that modulate light irradiated from the light source 211, and a projection lens 213 that projects the light that has been modulated by the optical modulators 212. In the present embodiment, liquid crystal light bulbs 212R, 212G, and 212B are used for the optical modulators 212. Namely, the rear projector 201 of the present embodiment is what is known as a liquid crystal projector.

As shown in FIG. 18, the projection engine 207 is formed by a light source 211, dichroic mirrors 214 and 215, reflective mirrors 216, 217, and 218, an entry lens 219, a relay lens 220, an exit lens 221, liquid crystal light bulbs 212R, 212G, and 212B, a cross dichroic prism 222, a projection lens 213, and the like. In addition to these, it is also possible to provide an integrator optical system that uniformizes the illumination distribution of light irradiated from the light source 211, and a polarization conversion optical system that makes the polarization state of the light irradiated from the light source 211 the same as the polarization used by the liquid crystal light bulbs 212R, 212G, and 212B.

The light source 211 is formed by a lamp 224 such as a high pressure mercury lamp or a metal halide lamp, and a reflector 225 that reflects the light from the lamp 224. The dichroic mirror 214 has the function of allowing red light that is included in the white light from the light source 211 to pass through while reflecting blue light and green light. The dichroic mirror 215 has the function of allowing blue light to pass through while reflecting green light. Accordingly, red light that passes through the dichroic mirror 215 is reflected by the reflective mirror 216 and enters the liquid crystal light bulb 212R for red light. The green light that is reflected by the dichroic mirror 214 is reflected by the dichroic mirror 215 and enters the liquid crystal light bulb 212G for green light.

Furthermore, the blue light that is reflected by the dichroic mirror 214 passes through the dichroic mirror 215. In order to protect against light loss on the longer optical path of the blue light, a light guiding optical system 226 that is formed by a relay lens system that includes the entry lens 219, the relay lens 220, and the exit lens 221 is provided for the blue light. Blue light enters the liquid crystal light bulb 212B for blue light via this light guiding optical system 226.

The three colors of light that are modulated by their respective liquid crystal light bulbs 212R, 212G and 212B enter into the cross dichroic prism 222. The cross dichroic prism 222 is formed by adhering together four rectangular prisms, and a dielectric multilayer film that reflects red light and a dielectric multilayer film that reflects blue light are formed in an X shape at boundary faces thereof. The three colors of light are synthesized by the dielectric multilayer films so that light that represents a color image is formed. The synthesized light is projected on the screen 203 by the projection lens 213, which is a projection optical system, and an image is displayed in an enlarged form.

Next, the structure of the screen 203 will be described.

As shown in FIG. 19, the screen 203 of the present embodiment is formed by superimposing a Fresnel lens plate 229 on a scattering plate 230. These components are superimposed on the optical path of the projection light such that the Fresnel lens plate 229 side is positioned on the internal side of the housing 202, while the scattering plate 230 side is positioned on the external side (i.e., the viewer side) of the housing 202. A known typical Fresnel lens plate can be used for the Fresnel lens plate 229. This screen is a transmitting type of screen.

As shown in FIG. 20A, the cross sectional structure on a horizontal plane (i.e., the x-z plane) of the scattering plate 230 is made up of a tube array 232 that is formed by individually separate tubes 231. Specifically, a number of tubes 231 that are made of a transparent resin are arranged in parallel with each other in a row and fixed to the scattering plate 230. All of the tubes 231 have the same diameter and the same length, and the positions of the end portions of each are all aligned. Each tube 231 is shaped as a hollow circular column having both ends open, and an interior space thereof (i.e., a flow path) is filled with a scatterer 233 (described below) that is able to circulate. The scattering plate 230 is positioned such that the longitudinal direction of the tubes 231 is the vertical direction of the screen 203 (i.e., the up-down direction as seen by a viewer, the y direction). Moreover, adjacent tubes 231 are positioned such that side surfaces of each are in contact with each other. A light absorbent 234 is embedded in gaps between the tubes 231. The light absorbent 234 is embedded in only one surface side of the scattering plate 230 and no light absorbent 234 is embedded in the other surface. The light absorbent 234 is formed from a high light absorbent material, for example, black resin.

The scattering plate 230 is positioned such that the surface on the side thereof where the light absorbent 234 is provided faces the light exit side, while the surface on the side thereof where no light absorbent 234 is provided faces the light exit side. Moreover, on the surface on the light exit side of the scattering plate 230, the light absorbent 234 is not completely filled right up to a plane that is tangential to the plurality of circles of the cross-sectional configuration, wherein the plane passing through the apex portions of the circles, but instead the portions of the circles closest to the viewer side form open portions 234a where the light absorbent 234 is not present. This is because if the light absorbent 234 becomes filled right up to the plane passing through the apex portions of the aforementioned circles, the open portions 234a on the light exit side disappear and light is unable to be emitted. Accordingly, in the case of the present embodiment, the open portions 234a form vertically elongated fringes that extend in the up-down direction of the screen. The light absorbent 234 achieves an increase in contrast by reducing the reflection from external light such as indoor illumination light and the like.

As shown in FIG. 22, top ends and bottom ends of the above described tube array 232 is closed off by a top lid 236 and a bottom lid 237. The top lid 236 and bottom lid 237 maintain a circulation space for the scatterer inside them, and tightly seal the top and bottom open ends of the aforementioned tube array 232 from the outside. Moreover, the top lid 236 has partition plates 238 every second tube, for example, between the second and third tubes 231 from the left side in FIG. 22, and then again between the fourth and fifth tubes from the left in a recurring pattern. In contrast, the bottom lid 237 has partition plates 239 every second tube and in alternate positions from the top lid 236, for example, between the first and second tubes 231 from the left side in FIG. 22, and then again between the third and fourth tubes from the left in a recurring pattern. Note that it is also possible to insert packing or the like (not shown) between the tube array 232 and the top lid 236 and bottom lid 237 in order to prevent any leakage of the scatterer 233.

An inflow aperture 237a and an outflow aperture 237b for the scatterer 233 are provided respectively in both end portions of the bottom lid 237, and pipes 240 and 241 are connected respectively to the inflow aperture 237a and the outflow aperture 237b so as to form a flow path for the scatterer 233. In addition, a pump 242 (i.e., a flow device) is installed partway along the flow path. The pump 242 causes the scatterer 233 to flow forward, and the flow from the pump 242 may be a single direction circulation or may be a reciprocating circulation. Accordingly, the pump 242 may be a rotary pump or may be a reciprocating pump that has a piston and cylinder and performs a compression—decompression action. A rotary pump is particularly suitable in view of its quietness.

Using the above described structure, the scatterer 233 that has flowed into the interior of the scattering plate 230 from the inflow aperture 237a shown on the left edge in FIG. 22 flows upwards and then turns in the opposite direction at the top end of the left end tube 231. The scatterer 233 then flows downwards and then turns in the opposite direction at the bottom end of the second tube from the left and flows upwards. In this way, a single continuous flow repeats an up and down zigzag movement which advances overall from the left to the right, and is subsequently discharged from the outflow aperture 237 on the right edge. In this manner, because the scatterer can be made to spread to every single corner inside the screen, an effect of reducing scintillation over the entire surface of the screen is obtained. Furthermore, because the flow path is a closed path, a continuous flow of the scatterer 233 (i.e., of the light scattering particles) can be obtained using the pump 242.

The scatterer 233 is formed in a colloidal state by, for example, uniformly dispersing spherical light scattering particles (i.e., a light scattering material) in a dispersion medium such as water, and the light scattering particles are able to move in conjunction with the movement of the dispersion medium. Silicon oxides, alumina, calcium carbonate, glass beads, copolymers such as acrylic resin bases and the like, or amorphous organic base materials such as silicone resin bases and the like are favorably used for the light scattering particles. Alternatively, various materials may be considered such as an emulsion that is obtained by emulsifying fats and oils and then dispersing them in water, or cases in which the dispersion phase and dispersion medium are respectively a gas, a liquid, and a solid may also be considered. The particle diameter, dispersion concentration, and mass of these fine particles as well as the viscosity and the like of the dispersion medium are appropriately set so as to match the desired product characteristics.

When manufacturing the above described scattering plate 230, for example, the following method can be used. Firstly, a number of tubes 231 that are made from transparent resin are arranged in parallel with each other using an optional method. Next, the tubes 231 are adhered or fused so as to produce a large sheet-shaped tube array 232. The tube array 232 is then cut to a size suitable for a single screen so as to form a tube array 232 having predetermined dimensions. Next, the top lid 236 and the bottom lid 237 that have been separately manufactured are each fixed to the two open ends of the tube array 232. Next, black resin in an unsolidified state is coated onto one surface of the produced tube array 232, and the resin is then skinned using a spatula-like tool. By controlling the pressing force that is applied during the skinning, the black resin is forced fully deep into the gaps between adjacent tubes 231 so that predetermined areas of the apex portions of the tubes 231 are not covered by the black resin. In this manner, the light absorbent 234 can be formed. Alternatively, it is also possible to temporarily coat the black resin over the entire surface of the tube array 232, and then, using a method such as polishing, to remove a portion of the black resin so that only predetermined areas of the apex portions of the tubes 231 are exposed.

As has been described above, the screen 203 having the above described structure is assembled with the longitudinal direction of the tubes 231 of the scattering plate 230 extending in a vertical direction (i.e., the y direction). In addition, as shown in FIG. 20B, interiors of the tubes 231 of the scattering plate 230 are filled with the scatterer 233 which then flows through these tubes. At this time, the light scattering particles contained in the scatterer 233 each form a scatter center and secondary wave source. Therefore, as shown in FIG. 21, if light is projected from the projection engine 207 onto the screen 203, the scatter state of the projection light in predetermined locations of the screen 203 undergoes a variety of changes over time due to the light scattering particles that move in conjunction with the flow of the scatterer 233. This causes interference fringes that are generated by the projection light to be moved, and causes the pattern of the interference fringes to become more complex. As a result, the interference fringes are integrally averaged by the residual image effect (i.e., the residual image characteristics) of the viewer's eye, and scintillation is effectively reduced.

Furthermore, because the index of refraction of the scatterer 233 inside the scattering plate 230 is different from the index of refraction of air, due to the fact that the cross section of the scattering plate 230 is circular, a convex lens action is generated relative to the direction of the curvature (i.e., the left-right direction of the screen—the x direction). As shown in FIG. 20B, the open portions 234a where there is no light absorbent is formed in apex portions of the tubes 231 on the light emitting side of the scattering plate 230, however, projection light L is condensed by the aforementioned convex lens action and can pass through the open portion 234a. Moreover, due to this convex lens action, the projection light L is concentrated or dispersed and diffused within a suitable spread angle range. This spread angle determines the screen gain. Moreover, the spread angle is able to be adjusted by the shape of the cross section (i.e., the diameter and flatness of the circle) of the tubes 231. Namely, by controlling the cross-sectional configuration of the tubes 231 of the scattering plate 230, it is possible to obtain the desired screen gain. As a result of the above, in the screen 203 of the present embodiment, the scattering plate 230 has the same action as a lenticular lens array and the lenticular lens array is rendered unnecessary. In this manner, because the scattering plate 230 of the present embodiment is provided with screen gain control as well as an external light removal function, it has a high level of practical applicability.

It should be noted that, although residual image characteristics of the human eye vary from person to person, the residual image duration in the brightness of a normal room is generally held to be approximately 20 ms. Because of this, by accelerating the flow of the scatterer 233 using the pump 242 so that changes in the positions of the light scattering particles are faster than the residual image duration of the human eye, the light scattering particles can be made to move continuously and at a faster speed than the Brownian motion thereof. In conjunction with this, projection light is scattered by the light scattering particles in the flowing scatterer 233 and is diffracted. The pattern of the interference fringes consequently generated as a result of this undergoes various changes. Accordingly, within the visual response time, the interference fringes are averaged out which results in a viewer perceiving the brightness of the diffracted light as being uniform as if no light interference had been generated.

In this manner, interference fringes become unrecognizable to a viewer and any sense of glaring in an image is suppressed. This shows that scintillation has been reduced, and a high brightness, high image resolution, high quality image can be obtained. Furthermore, because the scatterer 233 is constantly circulated by the pump 242, the scintillation elimination effect can be maintained both reliably and over a long term. Accordingly, the entire screen has a uniform brightness and a high quality image having no light and dark unevenness can be obtained. As a result, any stress on a viewer is alleviated and there is no fatigue even after a long viewing time. Moreover, even if the interference fringes do not change in a fixed pattern, a satisfactory scintillation reduction effect can still be achieved, if the interference fringes having the largest pitch moves in a ratio exceeding the visual response time. Moreover, because there is no movement in the focusing direction of the scattering plate 230 (i.e., the z direction), no image blurring occurs.

In the present embodiment, when manufacturing a scattering plate 230 having an internal flow path, because it is possible to easily form an intricate flow path structure by arranging in rows the tubes 231 that are formed from a material having optical transparency, the structure is simplified and manufacturing costs can be reduced. The resin tubes that are used in the present embodiment, in particular, have the advantages that they are easily obtained as there are a large number of suppliers and they are inexpensive. Moreover, it is possible to cause the light scattering particles to move at a comparatively high speed simply by cause the scatterer 233 to flow using the small output pump 242. In the case of the present embodiment, in particular, because a structure is employed in which the scatterer 233 flows continuously in a single continuous flow inside the scattering plate 230, the above described effects are significant. Consequently, there is no need to move the screen 203 itself and scintillation can be effectively reduced at low energy and while generating little noise. Accordingly, it is possible to realize a rear projector that has excellent affordability, low energy consumption, and is quiet.

Note that in the present embodiment, an example is described in which there is provided a tube array 232 in which a plurality of tubes 231 are arranged in a row, and a scattering plate 230 is constructed in which a scatterer 233 flows in a continuous loop, however, instead of this structure, it is possible to construct a scattering plate that uses the same tube array, but in which the flow mode is different. In the same way as the scattering plate 230 shown in FIG. 22, a scattering plate 245 shown in FIG. 23 is also provided with a tube array 232 in which a plurality of tubes 231 are arranged in a row, and top and bottom open ends thereof are closed off by a top lid 246 and a bottom lid 247. However, the top lid 246 and the bottom lid 247 of this example differ from the top lid 236 and the bottom lid 237 shown in FIG. 22 in that they do not have the partition plates 238 and 239, and have only a unified interior space. In addition, an inflow aperture 246a for the scatterer 233 is provided in the left side of the top lid 246 in FIG. 23, while an outflow aperture 247b for the scatterer 233 is provided in the right side of the bottom lid 247. Pipes 240 and 241 are connected respectively to the inflow aperture 246a and the outflow aperture 247b, and a pump 242 (i.e., a flow device) is installed partway along the flow path.

In the structure shown in FIG. 23, the scatterer 233 that has flowed in from the inflow aperture 246a on the top left of the scattering plate 245 flows into the interior of the tubes 231 from the top end of each tube 231 while flowing from left to right inside the top lid 246. It then flows towards the bottom end of the tubes 231 and flows out from these bottom ends into the interior of the bottom lid 247. It then flows from left to right inside the bottom lid 247 and is discharged from the outflow aperture 247b at the bottom right of the scattering plate 245. Namely, while the scattering plate 230 shown in FIG. 22 is formed by a plurality of tubes 231 that are connected together in series, the scattering plate 245 of the present structure is formed by a plurality of tubes 231 that are connected together in parallel. In the scattering plate 245 of the present structure as well, it is possible to demonstrate the same effects as in the scattering plate 230 shown in FIG. 22, and the screen 203 that is provided with this scattering plate 245 is able to effectively suppress scintillation.

Moreover, in addition to a scattering plate that uses the above described tube array 232, it is also possible to construct a scattering plate from a single tube. This type of scattering plate can be constructed, for example, by bending or curving a single long flexible tube made of transparent resin and arranging it as a flat shape, and then fastening together adjacent portions. A specific example of a method of manufacturing this is a method in which, for example, while a flexible resin tube that has been wound onto a bobbin is being unwound from the bobbin, it is laid into a gap in a sandwich shaped mold that moves reciprocatingly. As a result, the resin tube is curved into a continuous series of S shapes. Subsequently, adjacent portions of the tube are either adhered or fused in a sheet shape. After this, end portions of the tube only may undergo processing to enable them to be connected to the pipes.

It is possible also in a scattering plate that has the above described structure to cause the scatterer to flow in a single continuous loop, and thereby realize the same effects as the scattering plate shown in FIG. 22 and effectively suppress scintillation. Moreover, during manufacturing, although a certain amount of labor is required to bend the elongated tube and curve and hold it, a top lid and bottom lid such as those of the scattering plates in FIG. 22 and FIG. 23 are rendered unnecessary, and manufacturing is possible using a smaller number of components.

Eighth Embodiment

The eighth embodiment of the invention will now be described with reference made to FIG. 24A through FIG. 25.

The basic structure of the rear projector of the present embodiment is the same as that of the seventh embodiment, and only the structure of the scattering plate of the screen differs from that of the seventh embodiment. Accordingly, in the description below, only the structure of the screen is described using FIGS. 24A through 25.

Figure 24A:
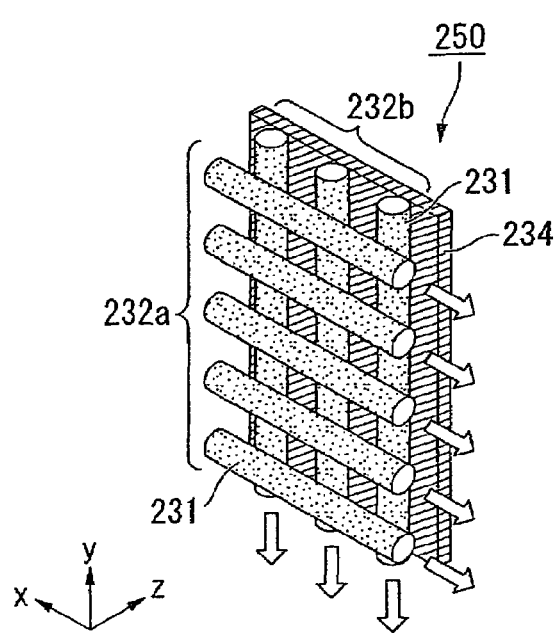
FIGS. 24A and 24B are perspective views showing a scattering plate of an eighth embodiment of the invention.
Figure 24B:
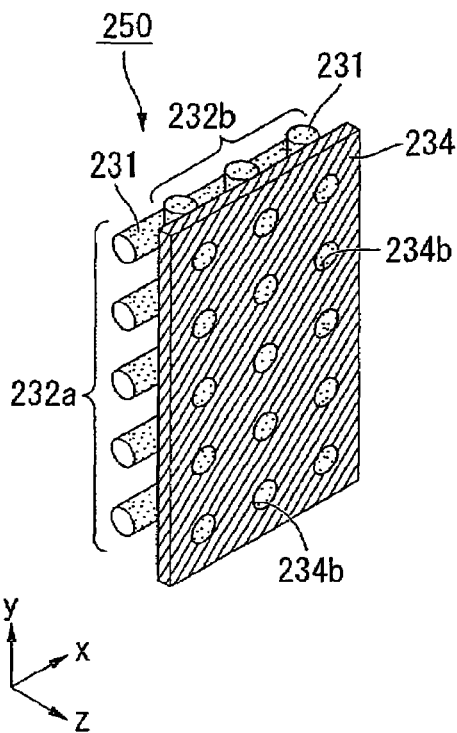

FIGS. 24A and 24B are perspective views showing the scattering plate of the present embodiment. FIG. 24A is a view as seen from the light entry side, while FIG. 24B is a view as seen from the light exit side (i.e., from the viewer side).

In the same way as in the seventh embodiment, the scattering plate of the present embodiment has a tube array in which a plurality of respectively independent tubes is arranged in a row. However, while only one tube array group 232 is used in the scattering plate 230 of the seventh embodiment, as shown in FIG. 24A, the scattering plate 250 of the present embodiment differs in that two groups of tube arrays 232a and 232b are stacked in the light transmission direction (i.e., the depth direction of the screen——the x direction).

Moreover, the tube array 232a on the light entry side is positioned such that the longitudinal directions of each tube 231 correspond to the left-right direction of the screen 203, while the tube array 232b on the light exit side is positioned such that the longitudinal directions of each tube 231 correspond to the up-down direction of the screen 203. Namely, the two tube array groups 232a and 232b are positioned such that the direction in which the tubes 231 of each group extend are orthogonal to each other. The arrows in FIG. 24A show the flow direction of the scatterer. By employing this structure, the scattering plate 250 of the present embodiment exhibits a dual lens action which is described below. Note that in order to make the drawings in FIG. 24A through FIG. 25 easier to view, gaps are shown between adjacent tubes 231 in the respective tube array groups 232a and 232b; however, it is not essential for gaps to be provided and, in the same way as in the seventh embodiment, it is also possible to employ a structure in which adjacent tubes 231 are tightly adhered to each other.

Moreover, a light absorbent 234 which demonstrates an external light removal function is placed between each of the adjacent tubes 231. In the seventh embodiment, the light absorbent 234 is deployed in a narrow elongated shape following the shape of the tubes 231 so that elongated striped open portions 234a are provided. In contrast, in the present embodiment, as shown in FIG. 24B, circular pinhole type open portions 234b are provided at lattice points where the tubes 231 intersect with other tubes 231 when seen in plan view. Accordingly, in the scattering plate 250 of the present embodiment, the plurality of open portions 234b of the light absorbent 234 is arranged in a lattice pattern.

When constructing the scattering plate 250 having the above described structure, it can be manufactured, for example, simply by stacking two layers of the tube arrays used in the seventh embodiment. Alternatively, it can also be manufactured by folding in half a tube array having twice the size. The latter manufacturing method is particularly effective in a scattering plate in which the flow mode is a single continuous loop. Thereafter, in order to form the light absorption body 234, an unsolidified black resin is coated on one surface of the tube array and is then skinned. By controlling the pressing force that is applied during the skinning, the black resin is forced deep into the gaps between adjacent tubes and the circular areas of the lattice points of the tubes are not covered by the black resin. Alternatively, it is also possible to temporarily coat the black resin over the entire surface of the tube array, and then, using a method such as polishing, to remove a portion of the black resin so as to form open portions. Alternatively, it is also possible to employ a method in which, using a black resin that has photosensitivity (or that generates an associated chemical change that is caused by light absorption), the black resin is removed only from the lattice points using the energy of the light that has been condensed by the lens function of the tube.

Figure 25:
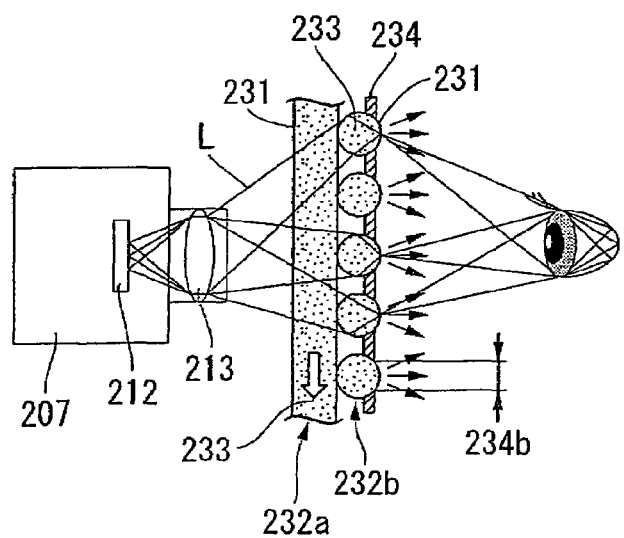
FIG. 25 is a view to illustrate an action of the scattering plate of the eighth embodiment.

As shown in FIG. 25, when light is projected from the projection engine 207 onto this screen 203 of the present embodiment, in the screen 203 as well, the scatter state of the projection light L in predetermined locations of the screen 203 undergoes various changes over time by the light scattering particles that are moving in conjunction with the flow of the scatterer 233. As a result, the interference fringe of the projection light L is moved and the pattern of the interference fringes changes to become more complex so that, as a result, scintillation is integrally averaged by the residual image effect (i.e., residual image characteristics) of the viewer and, effectively, scintillation is reduced. In the case of the present embodiment, in particular, because the tube arrays 232a and 232b are in two layers, changes in the scattering state are even greater, and scintillation can be removed even more effectively.

Moreover, because the index of refraction of the scattering plate 250 is different from the index of refraction of air, due to the effect of the circular cross section of the tubes 231 that constitute the scattering plate 250, a convex lens action is generated relative to the direction of the curvature. Here, in the present embodiment, because two tubes 231 whose radii of curvature are in directions that are orthogonal to each other (i.e., in the left-right direction and up-down direction) are layered at lattice points, what is known as a dual lens action is demonstrated in which light is condensed in both the left-tight direction and the up-down direction of the screen 203. Accordingly, provided there is suitable refraction, the projection light L is condensed and passes through the pinhole-shaped open portions 234b of the light absorbent 234 whose positions correspond to the lattice points.

Moreover, due to this convex lens action, the projection light L is concentrated or dispersed and diffused within a suitable spread angle range. This spread angle determines the screen gain. Moreover, the spread angle is able to be adjusted by the shape of the cross section (i.e., the diameter and flatness of the circle) of the tubes 231. Namely, by controlling the cross-sectional configuration of each tube 231 using pressing force between the two tube array groups 232a and 232b or by processing performed during the molding process, it is possible to obtain the desired over all screen gain. As a result of the above, in the screen 203 of the present embodiment, because the scattering plate 250 is provided with screen gain control as well as an external light removal function, it has a high level of practical usability.

Ninth Embodiment

Figure 26A:
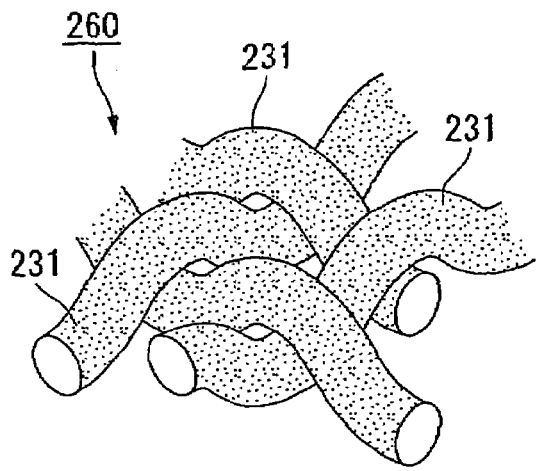
FIGS. 26A and 26B are perspective views showing a scattering plate of a ninth embodiment of the invention.
Figure 26B:
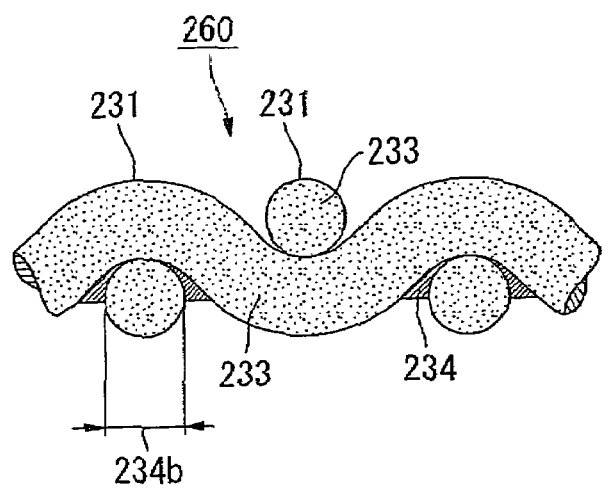
Figure 27:
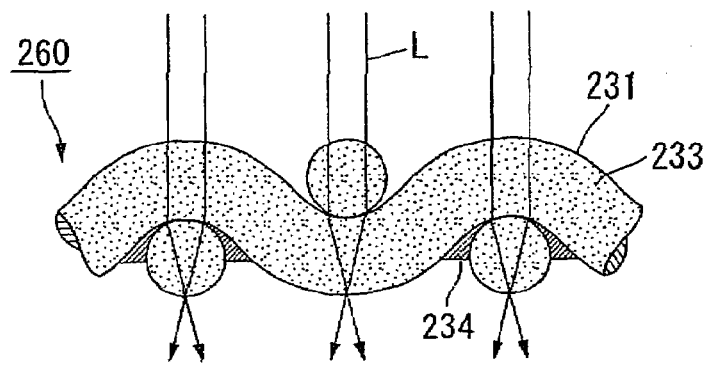
FIG. 27 is a view to illustrate an action of the scattering plate of the ninth embodiment.

The ninth embodiment of the invention will now be described using FIG. 26A through FIG. 27.

The basic structure of the rear projector of the present embodiment is the same as that of the seventh embodiment, and only the structure of the scattering plate of the screen is different from that in the seventh and eighth embodiments. Accordingly, only the structure of the screen is described below using FIG. 26A through FIG. 27.

In the same way as in the seventh and eighth embodiments, the scattering plate of the present embodiment has a tube array in which a plurality of respectively independent tubes is arranged in rows. However, while tube arrays are stacked in two layers in the scattering plate of the eighth embodiment, as shown in FIG. 26A and FIG. 26B, in the scattering plate 260 of the present embodiment, tubes 231 and 231 that each extend in mutually intersecting directions have a woven net structure. Namely, the tubes 231 that extend in mutually orthogonal directions as if weaving a cloth with vertical threads and horizontal threads form a flat surface while inter-weaving with each other alternatingly. Moreover, in the same way as in the eighth embodiment, the aspect of invention may also be formed as a structure provided with the light absorbent 234 having the pinhole-shaped open portions 234b. This makes it possible to achieve a higher contrast in the screen.

In the present embodiment as well, the same effects as in the eighth embodiment can be obtained, namely, the effect of reliably removing scintillation and the effect of controlling screen gain using a convex lens action. Moreover, in the case of the present embodiment, it is possible, for example, to prepare a pliable tube having flexibility and, after weaving a tube using a fabric weaving loom, use this to manufacture the scattering plate 260. Accordingly, it is possible, for example, to effectively use equipment such as existing weaving looms and the like that are currently not in use and thereby reduce manufacturing costs. In this case, the degree of flatness of the tubes at the lattice points can be controlled using the tension on the weaving loom so that a desired screen gain can be obtained.

Tenth Embodiment

The tenth embodiment of the invention will now be described with reference made to FIG. 28.

The present embodiment is an image display unit that employs a scanning section instead of using optical modulators such as liquid crystal light bulbs. Note that because the structure of the screen is the same as that of the above described seventh embodiment, the same descriptive symbols are given to common component elements and a detailed description thereof is omitted.

Figure 28:
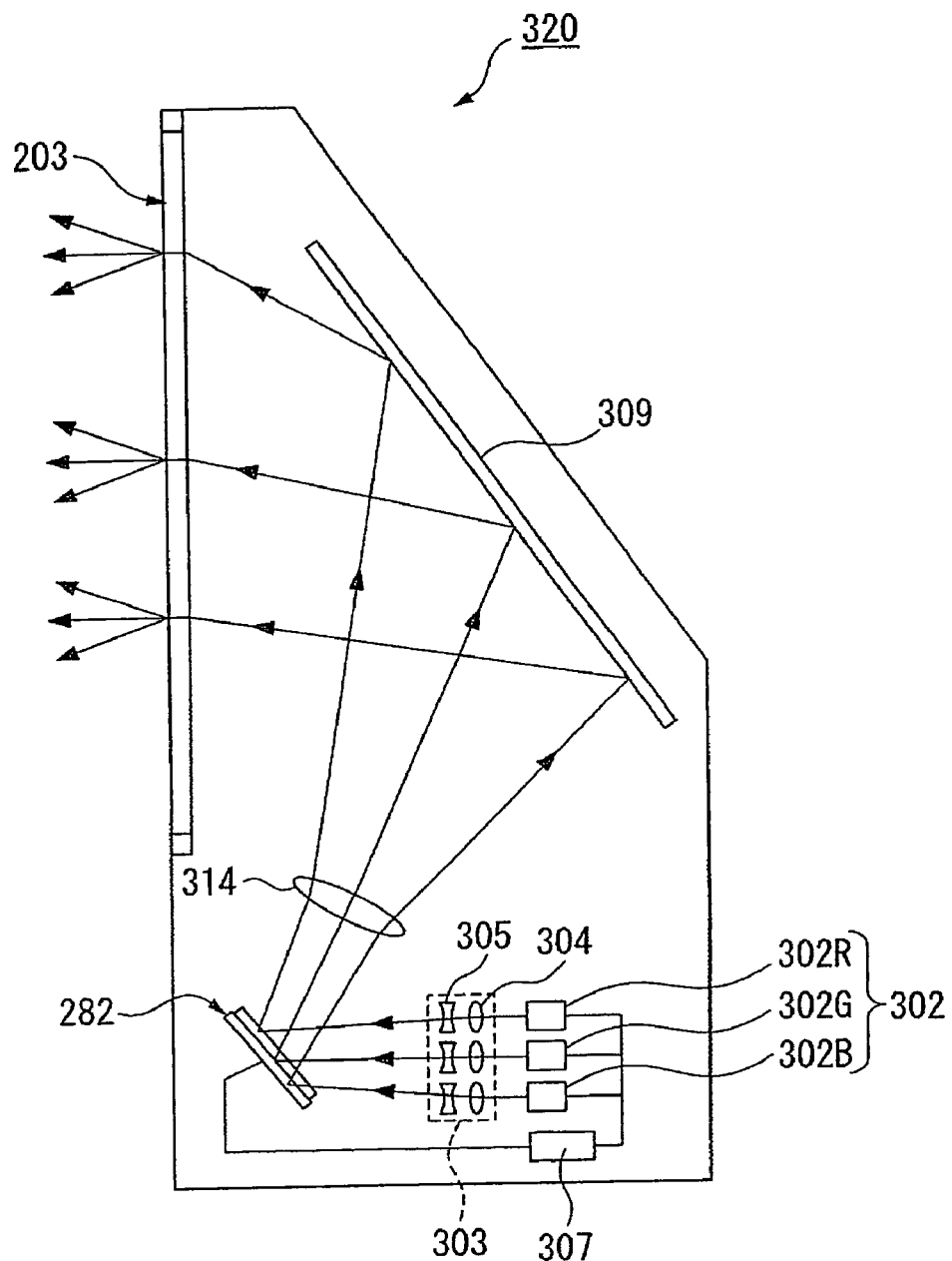
FIG. 28 is a cross-sectional view showing an image display unit of a tenth embodiment of the invention.
Figure 29A:
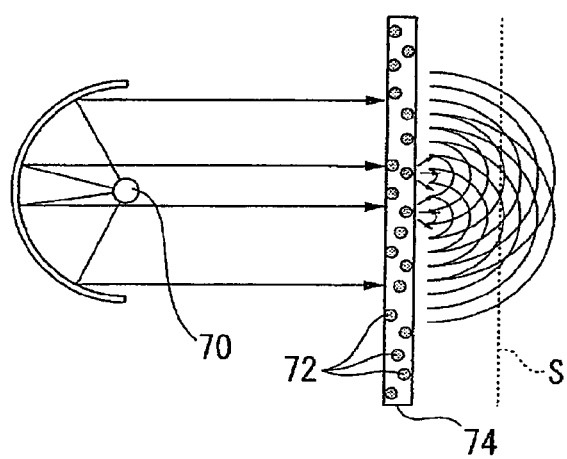
FIGS. 29A and 29B are a view to illustrate the theory behind the occurrence of scintillation.
Figure 29B:
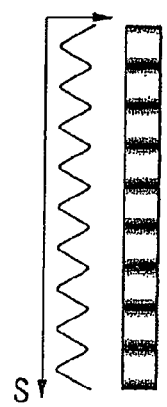

FIG. 28 is a cross-sectional view showing the schematic structure of a rear projector 320 (i.e., an image display unit).

As shown in FIG. 28, the rear projector 320 of the present embodiment is provided with a light source 302 that irradiates laser light, a lens optical system 303 that includes a collimator optical system 304 and a beam shaping optical system 305, a scanner 282 that scans irradiated laser light in a two-dimensional direction, a projection lens 314 that enlarges and projects scanned light, and a reflective mirror 309 that reflects projected light towards the screen 203. The light source 302 has a red laser diode 302R that irradiates red laser light, a green laser diode 302G that irradiates green laser light, and a blue laser diode 302B that irradiates blue laser light.

Laser light that has been irradiated from the laser diodes 302R, 302G, and 302B is input into the scanner 282 via the lens optical system 303. This input laser light is scanned in a two-dimensional direction by the scanner 282 and is then projected onto the screen 203 via the projection lens 314 and the reflective mirror 309. In this manner, the rear projector 320 of the present embodiment forms an image by causing laser light irradiated from the light source 302 to be scanned onto the screen 203 by the scanner 282.

Because the screen 203 of the above described embodiments is also used in the scanning rear projector 320 that uses a laser light source such as in the present embodiment, the same operation and effects can be obtained as in the above described embodiments, and it is possible for scintillation to be effectively reduced.

While preferred embodiments of the invention have been described and illustrated above, it should be understood that these are exemplary of the aspect of invention and are not to be considered as limiting. For example, in the above described embodiments, tubes having a toroidal cross section are used for the tubes forming the scattering plate, however, although the lens action will not be obtained it is also possible to use tubes having a rectangular ring cross section or a polygonal cross section. In such cases, in order to control the screen gain and viewing angle, it is also possible to attach a lenticular lens array to the front surface of the scattering plate (i.e., on the viewer side). Moreover, in the above described embodiments, a structure is employed in which adjacent tubes are placed in parallel with each other and all of the tubes are positioned with no gap between them so that the scatterer flows everywhere throughout all portions of the scattering plate, however, it is not absolutely essential for a plurality of tubes to be placed in parallel with each other and, although this might be an extreme case, it would also be possible to position the tubes such their longitudinal directions all pointed in random directions.

In addition to this, the specific structures of the devices that cause the scatterer to flow such as the flow path, pump and the like that are illustrated in the above described embodiments are not limited to those in the above described embodiments and various modifications may be made as is appropriate. Furthermore, as far as rear projectors as a whole are concerned, it is also possible, in addition to the liquid crystal light bulbs that are used as optical modulators, for the aspect of invention to be employed in projectors that use reflective optical modulators such as digital micromirror devices (DMD).

While preferred embodiments of the invention have been described and illustrated above, it should be understood that these are exemplary of the aspect of invention and are not to be considered as limiting. Additions, omissions, substitutions, and other modifications can be made without departing from the spirit or scope of the aspect of invention. Accordingly, the aspect of invention is not to be considered as limited by the foregoing description and is only limited by the scope of the appended claims.

What is claimed is:

1. A screen that displays images as a result of receiving projection light, comprising:
    a plurality of plate components that are optically transparent and are provided apart from each other;
    a scatterer that is placed in a light scattering space that is formed between the plurality of plate components, and is formed by dispersing a light scattering material in a gas or liquid dispersion medium;
    a flow path that allows the scatterer to flow through the light scattering space; and
    a flow device that causes the scatterer to flow through the light scattering space,
    wherein the scatterer flows along a surface of the plate components, and
    wherein the plate components have a first end portion and a second end portion that is opposite to the first end portion, and the scatterer moves reciprocatingly along the surface of the plate components by turning in an opposite direction at a position of the first end portion and the second end portion.

2. The screen according to claim 1, wherein the flow path is formed in the light scattering space by providing a first partition wall that is in contact with the first end portion and extends without making contact with the second end portion, and second partition wall that is in contact with the second end portion and extends without making contact with the first end portion alternately with each other along a flow direction of the scatterer.

3. The screen according to claim 2, wherein the flow path has a third partition wall that causes the scatterer to flow in a direction that intersects a forward movement direction of the scatterer.

4. The screen according to claim 1, wherein the scatterer circulates along a flow path between the light scattering space and the flow device that is provided externally to the light scattering space.

5. The screen according to claim 1, wherein the plate component that is located closest to a viewer side among the plurality of plate components is a lenticular lens sheet.

6. The screen according to claim 1, wherein the plate component that is located closest to a viewer side among the plurality of plate components has a plurality of groove portions that have a semicircular configuration when viewed in cross section and that are all parallel with each other, and wherein the plate component is formed from a material that has a different index of refraction from that of the scatterer.

7. The screen according to claim 1, wherein the flow device is a pump.

8. A rear projector comprising:
    a light source that emits light;
    an optical modulator that modulates light emitted from the light source;
    the screen according to claim 1; and
    a projection device that projects light that has been modulated by the optical modulator onto the screen.

9. An image display unit comprising:
    a light source that emits light;
    the screen according to claim 1; and
    a scanning section that scans light that has been emitted from the light source onto the screen.

10. A screen onto which image light is projected, comprising:
    a scatterer that is formed by dispersing a light scattering material in a gas or liquid dispersion medium;
    a scattering plate that has an internal flow path that allows the scatterer to flow; and
    a flow device that causes the scatterer to flow through the flow path wherein
    the scattering plate is formed from an optically transparent material, and a tube that enables the scatterer to circulate through an interior thereof is arrayed in the scattering plate, and
    wherein, in the scattering plate, a plurality of the tubes are arrayed in parallel with each other within a plane that is perpendicular to the optical axis of the image light.

11. The screen according to claim 10, wherein, in the scattering plate, a plurality of layers of the tube arrays, that are made up of the tubes that are arrayed in parallel with each other within a plane that is perpendicular to the optical axis of the image light, are stacked in the direction of the optical axis of the image light.

12. The screen according to claim 10, wherein the tube have a circular cross section.

13. The screen according to claim 10, wherein the scatterer circulates between the scattering plate and the flow device that is placed externally to the scattering plate.

14. The screen according to claim 10, wherein the flow device is a pump.

15. A rear projector comprising:
a light source that emits light;
an optical modulator that modulates light emitted from the light source;
the screen according to claim 10 onto which light that has been modulated by the optical modulator is projected; and
a projection device that projects light that has been modulated by the optical modulator onto the screen.

16. A projection system comprising:
the screen according to claim 10; and
a projection engine that projects image light onto the screen.

17. An image display unit comprising:
a light source that emits light;
the screen according to claim 10; and
a scanning section that scans light that has been emitted from the light source onto the screen.

18. A screen onto which image light is projected, comprising:
a scatterer that is formed by dispersing a light scattering material in a gas or liquid dispersion medium;
a scattering plate that has an internal flow path that allows the scatterer to flow; and
a flow device that causes the scatterer to flow through the flow path,
wherein the scattering plate is formed from an optically transparent material, and a tube that enables the scatterer to circulate through an interioir thereof is arrayed in the scattering plate, and
wherein, in the scattering plate, the tube is bent, and the portions of the tube that are separated by the bend are arrayed in parallel with each other, within a plane that is perpendicular to the optical axis of the image light.

19. The screen according to claim 18, wherein, in the scattering plate, a plurality of layers of the tube arrays, that are made up of the tubes that are arrayed in parallel with each other within a plane that is perpendicular to the optical axis of the image light, are stacked in the direction of the optical axis of the image light.

20. A screen onto which image light is projected, comprising:
a scatterer that is formed by dispersing a light scattering material in a gas or liquid dispersion medium;
a scattering plate that has an interal flow path that allows the scatterer to flow; and
a flow device that causes the scatterer to flow through the flow path,
wherein the scattering plate is formed from an optically transparent material, and a tube that enables the scatterer to circulate through an interior thereof is arrayed in the scattering plate, and
wherein, in the scattering plate, a plurality of the tubes that each extend in mutually intersecting directions have a woven net structure.

21. A screen onto which an image light is projected, comprising:
a scatterer that is formed by dispersing a light scattering material in a gas or liquid dispersion medium;
a scattering plate that has an internal flow path that allows the scatterer to flow; and
a flow device that causes the scatterer to flow through the flow path,
wherein the scattering plate is formed from an optically transparent material, and a tube that enables the scatterer to circulate through an interioir thereof is arrayed in the scattering plate, and
wherein a light absorbent is provided between a plurality of the tubes that are mutually adjacent.

* * * * *